(12) United States Patent
Matsumoto et al.

(10) Patent No.: US 9,594,238 B2
(45) Date of Patent: Mar. 14, 2017

(54) ABERRATION CORRECTION DEVICE AND LASER MICROSCOPE

(71) Applicant: CITIZEN HOLDINGS CO., LTD., Tokyo (JP)

(72) Inventors: Kenji Matsumoto, Tokyo (JP); Ayano Tanabe, Tokyo (JP); Nobuyuki Hashimoto, Saitama (JP); Makoto Kurihara, Saitama (JP); Masafumi Yokoyama, Tokyo (JP)

(73) Assignee: CITIZEN WATCH CO., LTD., Tokyo (JP)

( * ) Notice: Subject to any disclaimer, the term of this patent is extended or adjusted under 35 U.S.C. 154(b) by 0 days.

(21) Appl. No.: 14/401,526

(22) PCT Filed: Mar. 15, 2013

(86) PCT No.: PCT/JP2013/057473
§ 371 (c)(1),
(2) Date: Nov. 16, 2014

(87) PCT Pub. No.: WO2013/172085
PCT Pub. Date: Nov. 21, 2013

(65) Prior Publication Data
US 2015/0116812 A1    Apr. 30, 2015

(30) Foreign Application Priority Data

May 17, 2012 (JP) ................................. 2012-113165
Jan. 30, 2013 (JP) ................................. 2013-015611

(51) Int. Cl.
*G11B 7/135* (2012.01)
*G02F 1/13* (2006.01)
(Continued)

(52) U.S. Cl.
CPC ..... *G02B 21/0072* (2013.01); *G02B 21/0032* (2013.01); *G02B 21/06* (2013.01);
(Continued)

(58) Field of Classification Search
CPC  G02B 21/0072; G02B 21/0032; G02B 21/06; G02B 5/3016; G02B 5/3083;
(Continued)

(56) References Cited

U.S. PATENT DOCUMENTS 5,416,757 A * 5/1995 Luecke .............. G11B 7/13925
                                                         250/201.5
5,530,590 A     6/1996 Saito
(Continued)

FOREIGN PATENT DOCUMENTS

CN       1505769 A       6/2004
JP    2002-184027 A       6/2002
(Continued)

OTHER PUBLICATIONS

International Search Report for PCT/JP2013/057473, Jun. 11, 2013.
(Continued)

*Primary Examiner* — Evelyn A Lester

(57) ABSTRACT

An aberration correction device (3) corrects wave front aberration arising in an optical system that includes an object lens (4) disposed in an optical path for light beams output by a coherent light source (1). The aberration correction device (3) has a symmetrical aberration correction element (3a) that corrects symmetrical aberrations, which are the wave front aberrations that are symmetrical with respect to the optical axis among the wave front aberrations generated in the optical path, and an asymmetrical aberration correction element (3b) that corrects asymmetrical aberrations, which are wave front aberrations that are asymmetrical with respect to the optical axis, generated in light beams incident obliquely on the object lens (4).

8 Claims, 18 Drawing Sheets

(51) Int. Cl.
| | |
|---|---|
| G02F 1/1335 | (2006.01) |
| G02F 1/01 | (2006.01) |
| G02B 21/00 | (2006.01) |
| G02B 21/06 | (2006.01) |
| G02F 1/133 | (2006.01) |
| G02F 1/1343 | (2006.01) |
| G02F 1/139 | (2006.01) |
| G02B 5/30 | (2006.01) |
| G02F 1/1347 | (2006.01) |
| G02B 5/18 | (2006.01) |
| G02B 27/28 | (2006.01) |
| G02F 1/03 | (2006.01) |
| G02F 1/13363 | (2006.01) |
| G02B 27/00 | (2006.01) |
| G02B 26/06 | (2006.01) |
| G02F 1/19 | (2006.01) |

(52) U.S. Cl.
CPC ........... *G02B 27/0031* (2013.01); *G02F 1/01* (2013.01); *G02F 1/1313* (2013.01); *G02F 1/1393* (2013.01); *G02F 1/13306* (2013.01); *G02F 1/134309* (2013.01); *G02B 5/1814* (2013.01); *G02B 5/3016* (2013.01); *G02B 5/3083* (2013.01); *G02B 26/06* (2013.01); *G02B 27/0068* (2013.01); *G02B 27/283* (2013.01); *G02F 1/0311* (2013.01); *G02F 1/1347* (2013.01); *G02F 1/13363* (2013.01); *G02F 1/19* (2013.01); *G02F 2203/12* (2013.01); *G02F 2203/18* (2013.01); *G02F 2203/50* (2013.01)

(58) Field of Classification Search
CPC .. G02B 26/06; G02B 27/0068; G02B 27/283; G02B 5/1814; G02B 1/19; G02F 1/01; G02F 1/1313; G02F 1/13306; G02F 1/134309; G02F 1/1393; G02F 2203/50; G02F 2203/18; G02F 1/13363; G02F 1/1347; G02F 1/0311; G02F 2203/12
USPC ....... 369/112.02, 53.19, 44.23, 44.14, 44.32, 369/112.01, 112.11, 121; 349/2, 17, 193, 349/201, 202; 359/279
See application file for complete search history.

(56) References Cited

U.S. PATENT DOCUMENTS

| | | | | |
|---|---|---|---|---|
| 6,125,088 A * | 9/2000 | Ogasawara | ......... | G11B 7/0956 369/112.02 |
| 7,522,507 B2 * | 4/2009 | Hendriks | ............ | G02B 26/005 369/112.01 |
| 9,176,333 B2 * | 11/2015 | Yokoyama | ............ | G02F 1/1313 |
| 2003/0002425 A1 * | 1/2003 | Yamamoto | .......... | G11B 7/1369 369/112.02 |
| 2003/0063379 A1 * | 4/2003 | Fukuyama | ......... | G02B 21/0032 359/390 |
| 2004/0051833 A1 | 3/2004 | Hain et al. | | |
| 2006/0104183 A1 * | 5/2006 | Kataoka | ............. | G11B 7/0053 369/112.01 |
| 2006/0262425 A1 | 11/2006 | Sato et al. | | |
| 2007/0097822 A1 * | 5/2007 | Iwanaga | ................ | G11B 7/094 369/53.2 |
| 2007/0133372 A1 * | 6/2007 | Hirai | .................... | G11B 7/1369 369/112.01 |
| 2007/0183293 A1 * | 8/2007 | Murata | ..................... | G02F 1/29 369/112.02 |
| 2008/0013433 A1 * | 1/2008 | Kimura | ............. | G02B 27/0068 369/112.01 |
| 2008/0310263 A1 * | 12/2008 | Sagara | ................ | G11B 7/0945 369/44.32 |
| 2009/0213706 A1 * | 8/2009 | Hotta | ................. | G11B 7/13927 369/44.32 |
| 2009/0231692 A1 * | 9/2009 | Yoshida | ............. | G02B 21/0048 359/385 |
| 2009/0252011 A1 * | 10/2009 | Katayama | .......... | G11B 7/13927 369/53.25 |
| 2009/0274020 A1 * | 11/2009 | Katayama | ............. | G11B 7/139 369/44.23 |
| 2011/0075529 A1 * | 3/2011 | Shimamoto | ........ | G11B 7/08511 369/44.32 |
| 2011/0080814 A1 * | 4/2011 | Watanabe | ........... | G11B 7/08511 369/44.14 |
| 2015/0293337 A1 * | 10/2015 | Matsumoto | ........ | G02B 21/0068 359/250 |
| 2015/0338639 A1 * | 11/2015 | Matsumoto | ........ | G02B 21/0032 359/279 |

FOREIGN PATENT DOCUMENTS

| | | |
|---|---|---|
| JP | 3299808 B | 7/2002 |
| JP | 2003-067966 A | 3/2003 |
| JP | 2006-079000 A | 3/2006 |
| JP | 4149309 B | 9/2008 |
| JP | 2010-139951 A | 6/2010 |
| JP | 4554174 B2 | 9/2010 |

OTHER PUBLICATIONS

European Patent Office, Extended European Search Report for EP Patent Application No. 13791212.7, Dec. 17, 2015.
Japan Patent Office, Office Action for Japanese patent application No. 2014-515524, Jul. 26, 2016.
State Intellectual Property Office of the People's Republic of China, Office Action for Chinese patent application No. No. 201380025759.9, Apr. 13, 2016.

* cited by examiner

ABERRATION CORRECTION DEVICE AND LASER MICROSCOPE

TECHNICAL FIELD

The present invention relates to a technology, in an apparatus including an objective lens and using a coherent light source, in which a light flux to be irradiated on a specimen is phase-modulated, and aberrations generated depending on the specimen, various conditions or an alignment error between elements are compensated for acquiring an image having enhanced resolution.

BACKGROUND ART

A confocal laser microscope is configured such that laser light is focused on a specimen through an objective lens, a light flux of reflected light, scattered light, or fluorescent light generated on the specimen is transmitted by an optical system, and the light flux transmitted through a pinhole disposed at an optically conjugated position with respect to a light focusing point on the specimen is received on a detector. Disposing the pinhole makes it possible to filter the light generated on the specimen other than the light focusing point. Therefore, the confocal laser microscope is operable to acquire an image with a good S/N ratio.

Further, the confocal laser microscope is configured to acquire a planar image of the specimen by scanning the specimen with laser light along two directions (X-direction and Y-direction) orthogonal to each other, along a plane perpendicular to the optical axis. On the other hand, the confocal laser microscope is configured to acquire a plurality of tomographic images (Z-stack images) in Z-direction by changing the distance in the optical axis direction (Z-direction) between the objective lens and the specimen, whereby a three-dimensional image of the specimen is formed.

In observing a biospecimen, it is often the case that the biospecimen is observed through a cover glass in a state in which the biospecimen is immersed in a broth. Further, generally, the objective lens is designed so that the imaging performance at a position immediately below the cover glass is best. In observing the inside of a biospecimen, it is necessary to acquire an image transmitted through a broth or biological tissues and having a certain depth at an observation position. Aberrations are generated in proportion to the distance from the position immediately below the cover glass to the observation position, and as a result, the resolution may be lowered.

Aberrations which may be generated are described in detail referring to FIG. 1A and FIG. 1B. FIG. 1A and FIG. 1B are diagrams schematically illustrating aberrations generated depending on the depth of a specimen to be observed. To simplify the description, the objective lens is designed to be optimized in observing a medium having a uniform refractive index. FIG. 1A illustrates a light flux 100 in observing a medium having a uniform refractive index, as used in the design. FIG. 1A illustrates that the light flux 100 is focused on one point without aberrations. Contrary to the above, FIG. 1B illustrates a light flux 110 in observing the surface of a specimen at the depth D. The light flux 110 is refracted on an interface 111 between the medium in contact with the objective lens and the specimen. The light flux 110 is refracted, and is not focused on one point due to the generated aberrations.

For instance, when the objective lens is a dry lens, the space between the objective lens and the specimen is filled with air. Therefore, the refractive index of the medium (air) between the objective lens and the specimen is 1.0, which is different from the refractive index of a biospecimen (e.g. 1.39). Aberrations are generated in proportion to the difference between the refractive index of the medium between the objective lens and the specimen, and the refractive index of the biospecimen, and to the depth of the biospecimen with respect to the observation position. On the other hand, when the objective lens is a water immersion lens, the space between the objective lens and the specimen is filled with water. Therefore, the refractive index of the medium (water) between the objective lens and the specimen is 1.333, which is closer to the refractive index of the biospecimen than the refractive index of air. The water immersion lens is suitable for observing a deep part of the biospecimen. However, the refractive index of the biospecimen is not equal to the refractive index of water. Therefore, aberrations are generated due to a difference between the refractive index of the biospecimen and the refractive index of water. Thus, lowering of the resolution is still a problem.

Further, the cover glasses have variations in the thickness thereof within the tolerance range from the design value (e.g. 0.17 mm). Aberrations are generated in proportion to a difference between the actual thickness of the cover glass and the design thickness due to a difference between the refractive index (=1.525) of the cover glass and the refractive index (=1.38 to 1.39) of the biospecimen. Spherical aberration having a phase distribution symmetrical with respect to an optical axis is generated due to deviations from the design value as described above.

Next, aberrations generated with respect to an off-axis light flux are described. The objective lens is designed so that the imaging performance with respect to an off-axis light flux is also best at a position immediately below the cover glass, as well as an on-axis light flux. When the inside of a specimen is observed as described above, asymmetrical aberrations as represented by coma aberration are generated in proportion to the depth of the specimen. Further, the amount of asymmetrical aberrations increases in proportion to the magnitude of the viewing angle. Therefore, when a periphery of an image obtained by photographing a specimen is mainly observed, the resolution of the peripheral portion of the image may be lowered due to asymmetrical aberrations, because the image of the specimen is obtained by a light flux having a large viewing angle.

Further, when aberrations are corrected by an aberration correction device, generally, the pupil position of the objective lens lies in the objective lens system. Therefore, positional deviation may occur in the optical axis direction between the aberration correction device and the objective lens, as far as a measure such as disposing the aberration correction device in the objective lens, or disposing the aberration correction device at such a position that the aberration correction device is conjugated with respect to the pupil position of the objective lens with use of a relay optical system, is not taken.

FIG. 2 is a diagram for representing positional deviation in the optical axis direction when a specimen is observed. In FIG. 2, to simplify the description, an aberration correction device 3 and an objective lens 4 are disposed to align with each other along the optical axis. In this example, the distance from the pupil position of the objective lens 4 to the aberration correction device 3 is Z. A light flux 200 focused on the optical axis is indicated by the solid line, and a light flux 210 converged at a position away from the optical axis is indicated by the dotted line. Out of a light flux incident on the aberration correction device 3, the off-axis light flux 210 is obliquely incident. As a result, the incident position of the off-axis light flux 210 is deviated from the incident position of the on-axis light flux 200 in a direction away from the optical axis by the distance d on a plane orthogonal to the optical axis of the aberration correction device 3. Therefore, it is necessary to consider the positional deviation when aberrations of the light flux 210 are corrected by the aberration correction device 3.

The positional deviation (distance d) in a direction orthogonal to the optical axis also occurs due to an alignment error between the objective lens and the aberration correction device, in addition to the above factor. Aberrations resulting from the positional deviation turn into asymmetrical aberrations such as coma aberration, as a difference component of spherical aberration.

As one means for solving image quality deterioration resulting from aberrations as described above, a correction ring has been proposed. The correction ring is a ring-shaped rotating member provided in an objective lens. The distances between lens groups constituting the objective lens are changed by rotating the correction ring. Aberrations due to an error in the thickness of the cover glass or observing a deep part of the biospecimen are cancelled by rotating the correction ring. A scale is marked on the correction ring. For instance, rough numerical values such as 0, 0.17, and 0.23 are indicated concerning the thickness of the cover glass. Adjusting the scale of the correction ring in accordance with the thickness of an actually used cover glass makes it possible to adjust the distances between lens groups in such a manner as to optimize the distances in accordance with the thickness of the cover glass (e.g. see Patent Literature 1).

Further, a technique of compensating for generated aberrations by a wave front conversion element is also known. This technique is a matrix-drivable shape variable mirror element that is disposed on an optical path of a microscope, a wave front is modulated by the shape variable mirror element based on wave front conversion data measured in advance, and the modulated light wave is allowed to be incident on a specimen, whereby an aberration-corrected image with a high imaging performance is acquired (see e.g. Patent Literature 2).

As the wave front conversion element, a shape variable mirror element configured such that the shape of a reflection surface thereof is electrically controllable is used. When a plane wave is incident on the shape variable mirror element, and if the shape variable mirror element has a concave shape, the incident plane wave is converted into a concave wave front (the amplitude of a concave shape is doubled).

Further, a microscope control method for controlling an aberration correction amount based on the distance between an objective lens and a specimen using such correction means is also known (see e.g. Patent Literature 3).

CITATION LIST

Patent Literature

Patent Literature 1: Japanese Patent Publication No. 3,299,808 (see pages 4-6, and FIG. 1)
Patent Literature 2: Japanese Patent Publication No. 4,149,309 (see pages 3-5, and FIG. 1)
Patent Literature 3: Japanese Patent Publication No. 4,554,174 (see FIG. 1)

SUMMARY OF INVENTION

Technical Problem

However, the operation of the correction ring is performed by manually rotating a ring-shaped adjustment mechanism provided on the objective lens. Therefore, focus deviation or view field deviation resulting from adjusting the adjustment mechanism may occur. Further, it is necessary to repeat adjusting the correction ring and focusing in order to determine the optimum position of the objective lens. This may make the process for optimization cumbersome. Since the process is cumbersome, it takes time to make adjustments in order to obtain an optimum position, and a fluorescent pigment may fade. Fading of a fluorescent pigment may weaken the fluorescent intensity due to continuous emission of excitation light.

Further, adjustment of the correction ring requires fine control. Under the present circumstances, judgment on the adjustment result relies on a person who visually observes an image. It is very difficult to judge whether the objective lens is located at an optimum position. In particular, in photographing images of Z stack, it is necessary to repeat the above operation by the number of times equal to the number of images to be acquired in depth direction, which is very cumbersome. As a result, under the present circumstances, the number of users who sufficiently utilize the correction ring may be small. Further, in some specimens, vibrations resulting from touching the correction ring by hand may affect the observation position. In view of the above, it is desirable to automatically adjust the correction ring without touching the correction ring by hand.

Further, the correction ring can correct only the distance in the optical axis direction (Z-direction) between lenses. Therefore, the objective lens provided with the correction ring can correct only symmetrical aberrations with respect to the optical axis, and cannot correct asymmetrical aberrations with respect to the optical axis.

Further, in the technology of compensating for aberrations by a wave front conversion element, the optical system of a microscope may be complicated and the size of the optical system may increase, because the wave front conversion element is of a reflective type. Furthermore, it is necessary to measure the aberrations in advance in order to obtain an optimum compensated wave front. A process of converging the correction amount in order to form an optimum wave front is required. Therefore, this technology is less feasible.

Furthermore, asymmetrical aberrations are generated due to an optical axis deviation between the wave front conversion element and the pupil position of the objective lens, a positional deviation in a direction orthogonal to the optical axis, or the depth of a specimen. Complex aberrations are generated by combination of symmetrical aberrations and asymmetrical aberrations. Thus, it takes time to converge an aberration correction amount by the wave front conversion element in order to obtain an optimum wave front.

In addition, when the aberration correction amount is controlled only based on the distance between the objective lens and the specimen, basically, the wave front conversion element is only capable of correcting symmetrical aberrations. Information such as a viewing angle and a positional deviation amount is necessary in order to correct asymmetrical aberrations.

In view of the above, an object of the invention is to solve the above problems and to provide an aberration correction device that corrects for aberrations generated depending on a specimen, an observation condition or an alignment error between elements, without the need of a drastic change in an existing optical system and without the need of touching an objective lens by hand. Another object of the invention is to provide a laser microscope incorporated with the aberration correction device that enables acquiring an image having a high imaging performance.

Solution to Problem

In order to solve the above drawbacks and to accomplish the objects, the aberration correction device of the invention includes the following configuration.

Specifically, the aberration correction device corrects wave front aberrations generated by an optical system including an objective lens disposed on an optical path of a light flux of coherent light to be emitted from a coherent light source. The aberration correction device includes a symmetrical aberration correction element which corrects symmetrical aberrations of the wave front aberrations generated on the optical path, the symmetrical aberrations being wave front aberrations symmetrical with respect to an optical axis; and an asymmetrical aberration correction element which corrects asymmetrical aberrations generated with respect to a light flux obliquely incident on the objective lens, the asymmetrical aberrations being wave front aberrations asymmetrical with respect to the optical axis.

Preferably, the aberration correction device may include an effective region having a size larger than a size of the pupil of the objective lens so as to correct the wave front aberrations so that the aberration correction device is disposed on an optical path between the coherent light source and the objective lens at a position different from a position of a pupil of the objective lens.

Further, in the aberration correction device, preferably, the symmetrical aberration correction element and the asymmetrical aberration correction element may be disposed along the optical axis.

In the aberration correction device, preferably, the symmetrical aberration correction element and the asymmetrical aberration correction element may constitute a phase modulation element which changes a phase modulation amount to be imparted to the light flux in accordance with an applied voltage.

In the above configuration, preferably, the phase modulation element may include a plurality of electrodes disposed at positions different from each other on a plane intersecting with the optical axis. Preferably, the aberration correction device may further include a control circuit which switches a voltage to be applied to each of the plurality of the electrodes between when the symmetrical aberrations are corrected and when the asymmetrical aberrations are corrected.

Further, preferably, the symmetrical aberration correction element may correct the symmetrical aberrations by imparting, to the light flux, a phase modulation amount in accordance with a first phase modulation profile which is obtained by inverting a phase distribution pattern of first-order spherical aberration to be obtained by resolving the wave front aberrations corresponding to the symmetrical aberrations into Zernike polynomials, and the asymmetrical aberration correction element may correct the asymmetrical aberrations by imparting, to the light flux, a phase modulation amount in accordance with a second phase modulation profile which is obtained by inverting a phase distribution pattern of first-order coma aberration to be obtained by resolving the wave front aberrations corresponding to the asymmetrical aberrations into Zernike polynomials.

Preferably, the symmetrical aberration correction element may correct the symmetrical aberrations by imparting, to the light flux, a phase modulation amount in accordance with a first phase modulation profile which is obtained by inverting a phase distribution pattern constituted of a sum of a phase distribution pattern of first-order spherical aberration and a phase distribution pattern of second-order spherical aberration to be obtained by resolving the wave front aberrations corresponding to the symmetrical aberrations into Zernike polynomials, and the asymmetrical aberration correction element may correct the asymmetrical aberrations by imparting, to the light flux, a phase modulation amount in accordance with a second phase modulation profile which is obtained by inverting a phase distribution pattern constituted of a sum of a phase distribution pattern of first-order coma aberration and a phase distribution pattern of second-order coma aberration to be obtained by resolving the wave front aberrations corresponding to the asymmetrical aberrations into Zernike polynomials.

Further, preferably, the asymmetrical aberration correction element may correct the asymmetrical aberrations by imparting, to the light flux, a phase modulation amount in accordance with a phase modulation profile which is obtained by inverting a phase distribution pattern constituted of a sum of a phase distribution pattern of a tilt component and a phase distribution pattern of an asymmetrical aberration component other than the tilt component, the tilt component and the asymmetrical aberration component being obtained by resolving the wave front aberrations corresponding to the asymmetrical aberrations into Zernike polynomials.

Further, in the aberration correction device, preferably, each of the symmetrical aberration correction element and the asymmetrical aberration correction element may be a liquid crystal element.

Further, in the aberration correction device, preferably, when the symmetrical aberration correction element and the asymmetrical aberration correction element constitute a phase modulation element, the phase modulation element may be a liquid crystal element.

According to another aspect of the invention, a laser microscope is provided. The laser microscope includes a light source which irradiates a light flux of coherent light; a first optical system which scans a specimen with the light flux from the light source; an objective lens which focuses the light flux on the specimen; a detector; a second optical system which transmits, to the detector, a second light flux including specimen information output from the specimen by incidence of the light flux on the specimen; and the aberration correction device disposed between the light source and the objective lens and including any one of the above configurations.

In the laser microscope, preferably, the aberration correction device may be disposed, on a side of the light source than the objective lens, at a position between the objective lens, and the first optical system and the second optical system.

Advantageous Effects of Invention

According to the invention, an aberration correction device, and a laser microscope incorporated with the aberration correction device are capable of correcting aberrations generated by deviation of the thickness of a medium from an estimated value, a change in the thickness of the medium, or a variation such as a tilt, when a deep part of a biospecimen is observed, or when the specimen is observed through a cover glass, and observing or measuring the specimen with enhanced resolution. In particular, the aberration correction device and the laser microscope are capable of correcting asymmetrical aberrations generated when a position, specifically, a periphery of an observation area, which is deviated from the optical axis due to a viewing angle is observed, and acquiring an enhanced image. Further, the aberration correction device and the laser microscope are capable of correcting aberrations including an influence of misalignment between the objective lens and the aberration correction device. In particular, when it is impossible to dispose the aberration correction device at a pupil position of the objective lens, for instance, when the pupil position of the objective lens and the position of the aberration correction device do not coincide with each other in the optical axis direction, and an off-axis light flux is observed, or when there is a misalignment between the objective lens and the aberration correction device, implementing spherical aberration correction by the aberration correction device results in generation of asymmetrical aberrations, because the aberration correction device is deviated from the optical axis. In view of the above, correcting both of symmetrical aberrations and asymmetrical aberrations by the aberration correction device is advantageous in accurately correcting a phase. Further, the aberration correction device and the laser microscope are operable to electrically correct aberrations without the need of touching the objective lens by hand. This is advantageous in automatically optimizing the position of the objective lens and in adjusting the position of the objective lens in synchronization with the observation depth in the Z stacking process, without the cumbersomeness such as adjusting a correction ring.

Further, as described above, in correcting aberrations by a correction ring, it is necessary to repeat adjustment of the correction ring and focusing, which makes the optimization process long and complicated. According to the aberration correction device and the laser microscope of the invention, it is possible to correct a phase distribution (a defocus component) that results from focusing as a phase modulation profile. This makes it possible to eliminate the repeating process for optimization, and to efficiently correct aberrations.

DESCRIPTION OF EMBODIMENTS

Figure 1A:
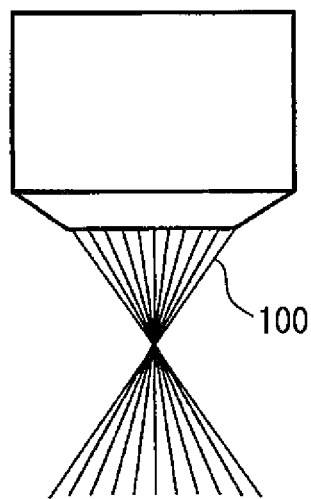
FIG. 1A is a diagram for representing aberrations generated in observing the surface of a specimen and in observing the inside of the specimen at the depth D.

In the following, preferred embodiments of an aberration correction device and a laser microscope incorporated with the aberration correction device according to the invention are described in detail referring to the drawings.

Figure 3:
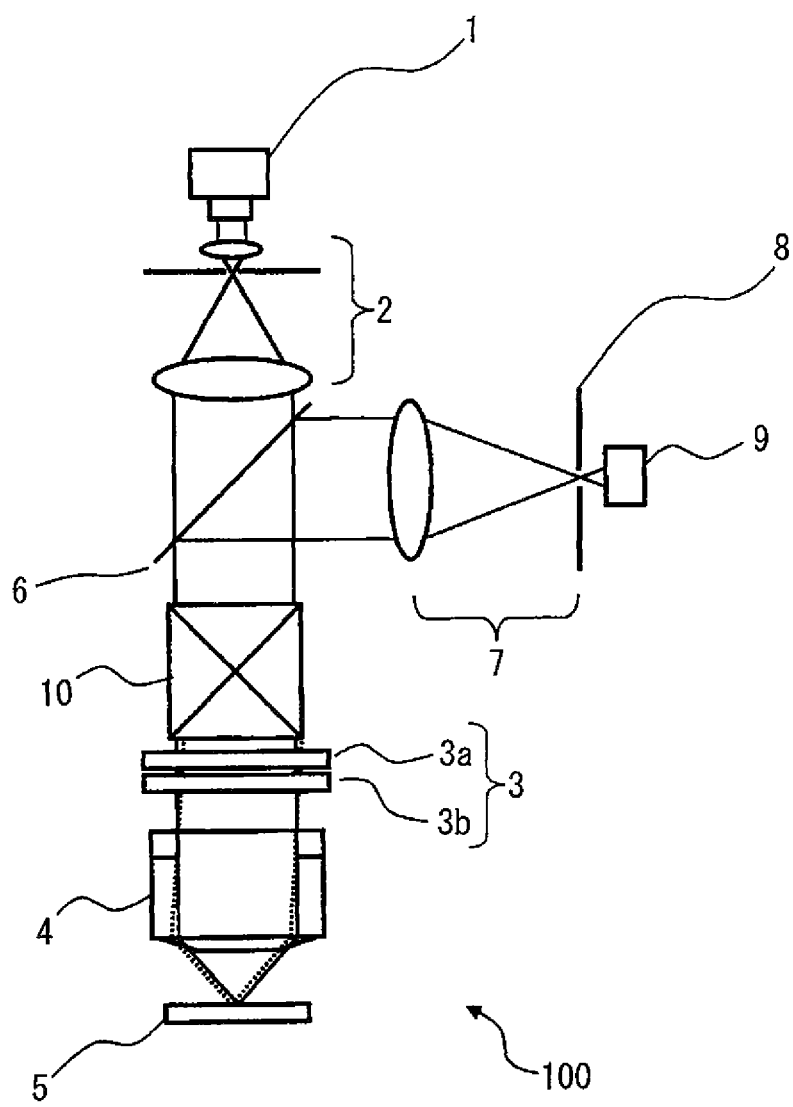
FIG. 3 is a schematic configuration diagram of a laser microscope according to an embodiment of the invention.

FIG. 3 is a schematic configuration diagram of a laser microscope 100 according to an embodiment of the invention. A light flux emitted from a laser light source 1 as a coherent light source is adjusted by a collimating optical system 2 into a parallel light beam. After the parallel light beam is transmitted through an aberration correction device 3, the aberration-corrected light is focused on a specimen 5 through an objective lens 4. A light flux including specimen information such as a light flux reflected or scattered on the specimen 5 or fluorescent light generated on the specimen returns along an optical path, is reflected on a beam splitter 6, and is focused again on a confocal pinhole 8 by a confocal optical system 7 as a second optical system. The confocal pinhole 8 cuts a light flux from the specimen at a position other than the focus position. Therefore, it is possible to obtain a signal having a good S/N ratio by a detector 9. The laser light source 1 may include a plurality of laser light sources whose wavelengths of laser light to be output are different from each other.

Further, although the detailed description is omitted, the laser microscope 100 is configured to obtain a two-dimensional image of the specimen 5 by causing a scan optical system 10 to scan the specimen 5 with laser light from the light source 1 along a plane orthogonal to the optical axis. Further, the laser microscope 100 is configured to obtain a three-dimensional image of the specimen 5 by scanning the specimen 5 in the optical axis direction while changing the distance between the objective lens 4 and the specimen 5, and obtaining a two-dimensional image of the specimen 5 at each distance.

The objective lens 4 is designed taking into consideration parameters including not only the inside of a lens system, but also the refractive index of the medium and the length of the optical path from a lens tip to an observation plane, for instance, the thickness of a cover glass or the presence or absence of a cover glass, and in such a manner that the imaging performance of the objective lens is optimized under the condition with estimated values of these parameters. According to the above configuration, aberrations may be generated due to the depth of a biospecimen as an object to be observed, or a thickness deviation resulting from manufacturing error of a cover glass. The aberrations may lower the imaging performance. In view of the above, the laser microscope 100 is configured to enhance the imaging performance by estimating wave front aberrations generated by an optical system from the laser light source 1 to the light focusing position of a light flux, including the objective lens 4, in accordance with the deviation of the optical path length from the design value; and by displaying, on the aberration correction device 3, a phase distribution that cancels the wave front aberrations as a phase modulation profile.

Generally, it is not possible to dispose an aberration correction device at a pupil position of an objective lens, in view of the space. Therefore, the aberration correction device 3 is disposed at a position conjugate to the pupil, with use of a relay lens. On the other hand, generally, an objective lens in a microscope is designed to be an infinite system, and a light flux incident on the objective lens is a parallel light beam. In view of the above, in the embodiment, it is preferable to omit a relay optical system, and to dispose the aberration correction device 3 on the light source side of the objective lens 4, specifically, at a position in the vicinity of the objective lens 4 in order to avoid an increase in size of an optical system. Disposing the aberration correction device 3 as described above is advantageous for the laser microscope 100 to effectively obtain the correction effects. Further, a light flux emitted from the laser light source 1 passes through the aberration correction device 3 twice along an outward path and along a return path. Thus, the aberration correction device 3 is configured to correct the phase of a light flux along an outward path and along a return path.

Figure 1B:
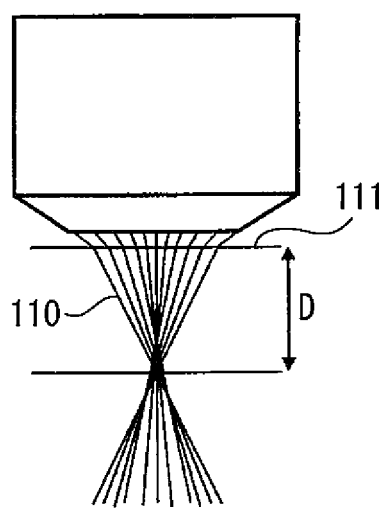
FIG. 1B is a diagram for representing aberrations generated in observing the surface of a specimen and in observing the inside of the specimen at the depth D.
Figure 4A:
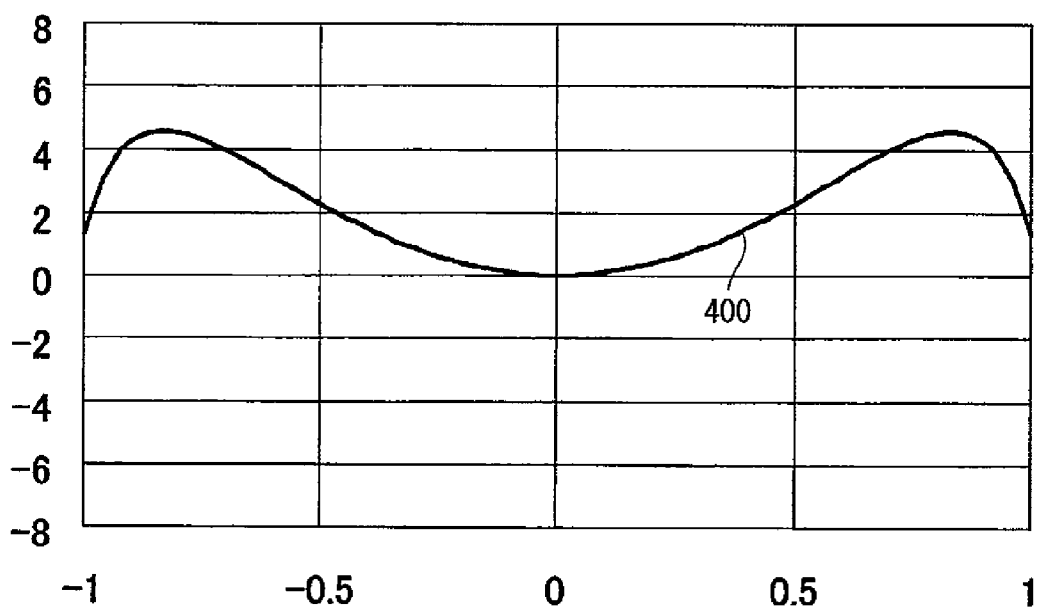
FIG. 4A is a diagram illustrating a phase distribution sectional pattern indicating an optical path length distribution on an optical axis generated when the inside of a biospecimen is observed by an objective lens whose numerical aperture NA is 1.15.
Figure 4B:
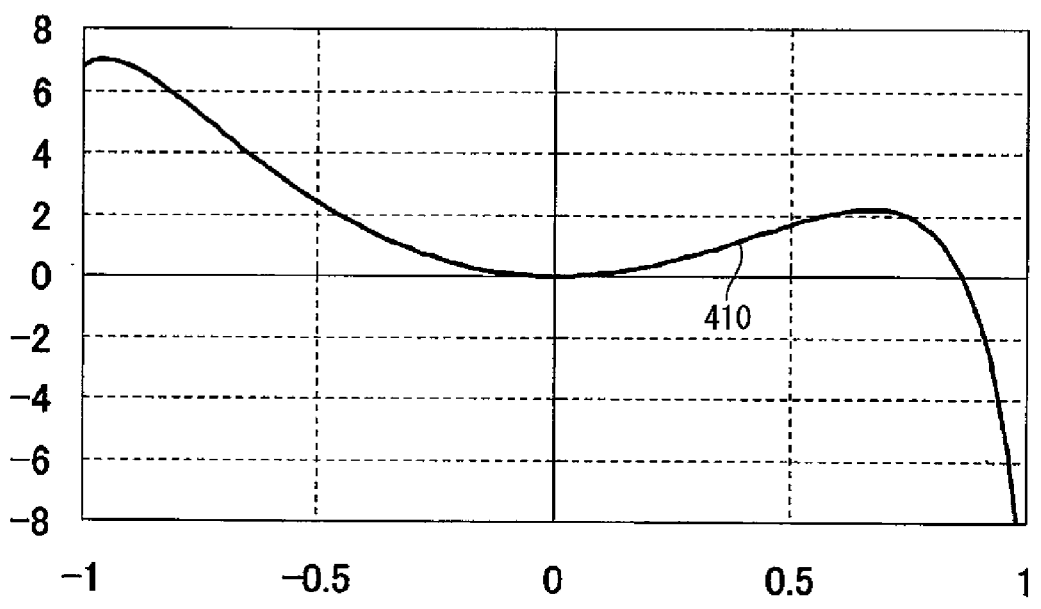
FIG. 4B is a diagram illustrating a phase distribution sectional pattern indicating an optical path length distribution on an incident plane of an off-axis light flux generated when the inside of a biospecimen is observed by an objective lens whose numerical aperture NA is 1.15.

In the following, aberrations generated by the depth of a specimen and a method for correcting the aberrations are described in detail. Aberrations generated by the depth of a specimen are as described above referring to FIG. 1B. Assuming that the inside of a specimen is observed through a water immersion lens, an example of calculating an optical path length is illustrated in FIG. 4A and FIG. 4B. Each of FIG. 4A and FIG. 4B is a diagram illustrating a phase distribution obtained by optical path calculation when a water immersion lens whose NA is 1.15 is used, assuming that the depth from the surface of a specimen and the refractive index of the specimen are respectively set to 250 μm and 1.39. It should be noted, however, that a phase distribution may have a phase opposite to the phase of the phase distribution illustrated in FIG. 4A and FIG. 4B depending on the thickness of a cover glass to be used or the depth from the surface of a specimen. The vertical axis indicates a value obtained by normalizing the phase difference, and the horizontal axis indicates a value obtained by normalizing the radius of the effective diameter of the aberration correction device by "±1". In other words, the position "0" on the horizontal axis corresponds to a position on the optical axis.

In FIG. 4A, a curve 400 indicates aberrations on the optical axis, and represents a spherical aberration pattern. Further, taking into consideration acquiring a two-dimensional image, it is necessary to consider off-axis characteristics. A curve 410 in FIG. 4B illustrates a phase distribution, on an incident plane, of a light flux obliquely incident on a specimen under the same condition as illustrated in the example of FIG. 4A. In this example, the incident angle with respect to the specimen is 7.4°. As illustrated by the curve 410, it is clear that asymmetrical components such as tilt and coma aberration are superimposed on spherical aberration.

As described above, aberrations are not generated when observing the surface of a specimen, but are generated when observing the inside of the specimen. The phase distribution of a light flux passing through an objective lens differs in accordance with the specifications of the objective lens or the viewing angle. The laser microscope 100 generates a phase modulation profile that cancels wave front aberrations, which represents the generated aberrations, by applying a voltage to an electrode provided in a phase modulation element of the phase modulation device 3 disposed at the pupil position of the objective lens 4. According to this configuration, the laser microscope 100 can correct the aberrations to thereby focus a light flux from the laser light source 1 on one point at an observation position defined on the surface of the specimen 5 or in the inside of the specimen 5. A light flux generated on the specimen also returns along the optical path in the same manner as described above. Therefore, the laser microscope 100 can convert the light flux into a plane wave.

The phase distribution of wave front aberrations as described above can be represented as a sum of components obtained by resolving the aberrations into the components. It is common to resolve wave front aberrations into orthogonal functions such as Zernike polynomials, and represent the wave front aberrations as a sum of the functions in order to control the aberration components independently of each other. In view of the above, there is supposed a method for obtaining a correction amount for wave front aberrations by representing the correction amount as a phase distribution of each of the functions of Zernike polynomials, and by changing the relative phase modulation amount of each of the functions.

Wave front aberrations are roughly classified into symmetrical aberrations as represented by spherical aberration, and asymmetrical aberrations as represented by coma aberration. For instance, when wave front aberrations are resolved using standard Zernike polynomials, the 13-th coefficient ($Z_{13}$) represents third-order spherical aberration, and the 25-th coefficient ($Z_{25}$) represents fifth-order spherical aberration. In other words, these coefficients represent symmetrical aberrations.

Likewise, when wave front aberrations are resolved using the standard Zernike polynomials, the 8-th and 9-th coefficients ($Z_8$, $Z_9$) represent first-order coma aberration, and the 18-th and 19-th coefficients ($Z_{18}$, $Z_{19}$) represent second-order coma aberration. In other words, these coefficients represent asymmetrical aberrations.

Figure 5A:
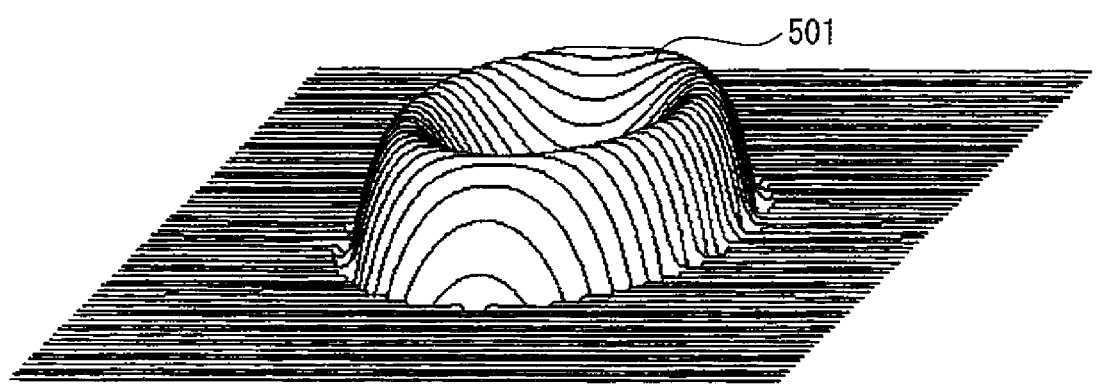
FIG. 5A is a three-dimensional perspective view of a phase distribution of first-order spherical aberration, and a diagram illustrating a partial sectional shape of the phase distribution in the form of a curve.
Figure 5A:
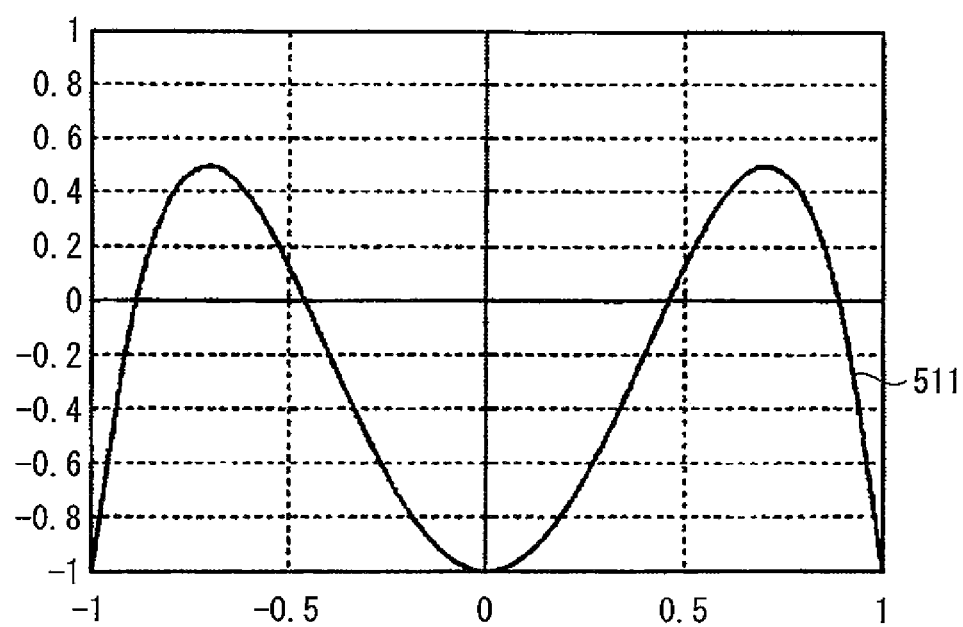

The shapes of these wave front aberrations are illustrated in FIG. 5A to FIG. 6B. FIGS. 5A and 5B respectively illustrate first-order spherical aberration and first-order coma aberration, and FIGS. 6A and 6B respectively illustrate second-order spherical aberration and second-order coma aberration. The aberrations illustrated in FIG. 5A, FIG. 5B, FIG. 6A, and FIG. 6B have a point-symmetric phase distribution. In the drawings of FIG. 5A, FIG. 5B, FIG. 6A, and FIG. 6B, stereoscopic diagrams 501, 502, 601, and 602 in the upper portions illustrate a wave front shape, and curves 511, 512, 611, and 612 in the graphs in the lower portions illustrate a sectional view of a phase distribution, which corresponds to a stereoscopic view, on a plane passing through the optical axis. In the graphs, the vertical axis indicates a value obtained by normalizing the phase difference at a maximum value thereof, and the horizontal axis indicates a value obtained by normalizing the effective diameter by setting the radius of the effective diameter of the aberration correction device 3 to "±1". In other words, the position "0" on the horizontal axis corresponds to a position on the optical axis.

Next, a phase modulation profile for use in actually correcting aberrations by the aberration correction device 3 is described in detail by an example. First of all, symmetrical aberrations, which are the aberrations symmetrical with respect to the optical axis, are described. It can be assumed that a phase distribution that remains by focusing matches with a shape such that the root mean square (RMS) value of the wave front having the phase distribution is minimum. Therefore, for instance, a method is proposed, in which a phase distribution including a defocus term in addition to first-order spherical aberration is obtained in such a manner that the RMS aberration is minimized, and a phase modulation profile is defined from the phase distribution.

Further, an approach is also proposed, in which a defocus component is added so that the phase modulation amount (hereinafter, referred to as a PV value) of a phase distribution is minimized, and a phase distribution corresponding to the minimum phase modulation amount is defined as a phase modulation profile. When the PV value is minimized, it is possible to set the phase modulation range (i.e. range of the phase modulation amount) to be small. This is advantageous in alleviating the specification requirement on the aberration correction device 3. For instance, when a liquid crystal element is used as a phase modulation element in the aberration correction device 3, it is possible to make the thickness of the liquid crystal layer of the liquid crystal element to be small. Further, generally, a response time of a liquid crystal element is proportional to a square of the thickness of a liquid crystal layer. Therefore, the smaller the phase modulation range is, the higher the response speed is. Further, the smaller the thickness of the liquid crystal layer is, the more the surface precision is.

Further, it can be assumed that the phase distribution that remains by focusing differs depending on the specifications of the microscope for use or the image processing software for use. It is possible to optimize the aberration correction by combining a residual aberration pattern specific to each of the microscope and the image processing software with the phase modulation profile of the aberration correction device.

Figure 7:
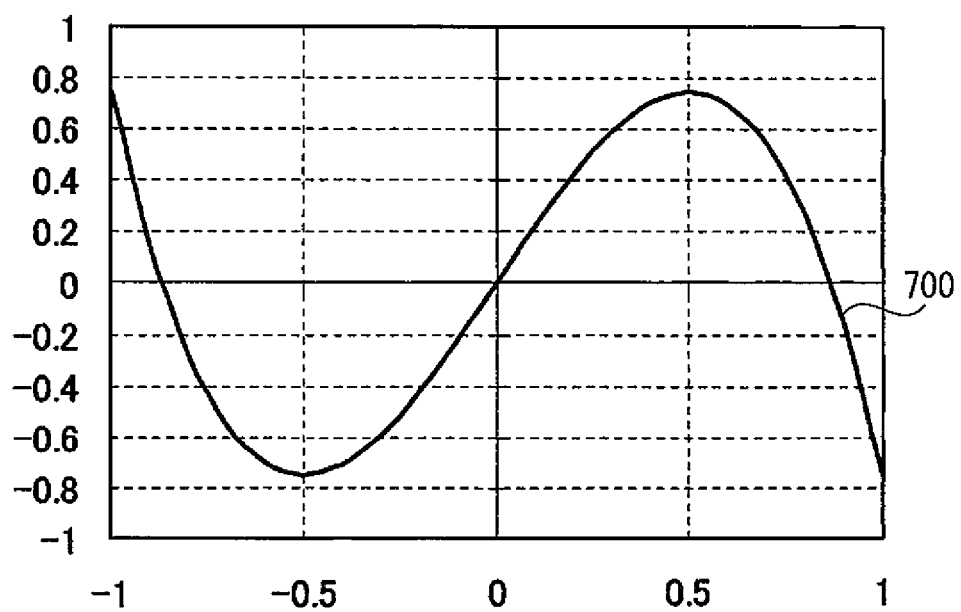
FIG. 7 is a diagram illustrating a phase modulation profile in which a PV value is minimum.

Next, asymmetrical aberrations as aberrations asymmetrical with respect to the optical axis are described. Taking into consideration the characteristics such that a light flux is an off-axis light flux, generated aberration components are not limited to defocus and spherical aberration, but include asymmetrical aberrations as represented by coma aberration. Also, in this case, tilt and first-order coma aberration of the objective lens 4 are dominant by optical path calculation. The aberration correction device 3 can provide a phase distribution optimum for cancelling the aberrations by a linear sum of these components. When it is intended to correct only coma aberration, as well as defocus as the symmetrical aberrations, adding an appropriate tilt component as the asymmetrical aberrations makes it possible to obtain a phase modulation profile 700, in which the PV value as illustrated in FIG. 7 is minimized with respect to coma aberration illustrated in FIG. 5B. Also in FIG. 7, the vertical axis indicates a value obtained by normalizing the phase difference at a maximum value thereof, and the horizontal axis indicates a value obtained by normalizing the effective diameter by setting the radius of the effective diameter of the disposed aberration correction device 3 to "±1". In this way, determining a phase modulation profile in such a manner that the PV value is minimized is advantageous in alleviating the specification requirement on the aberration correction device as described above.

Figure 5B:
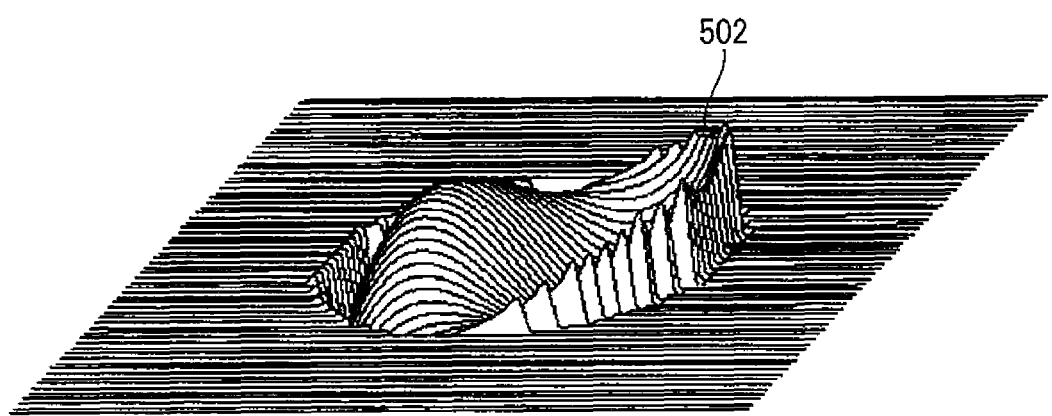
FIG. 5B is a three-dimensional perspective view of a phase distribution of first-order coma aberration, and a diagram illustrating a partial sectional shape of the phase distribution in the form of a curve.
Figure 5B:
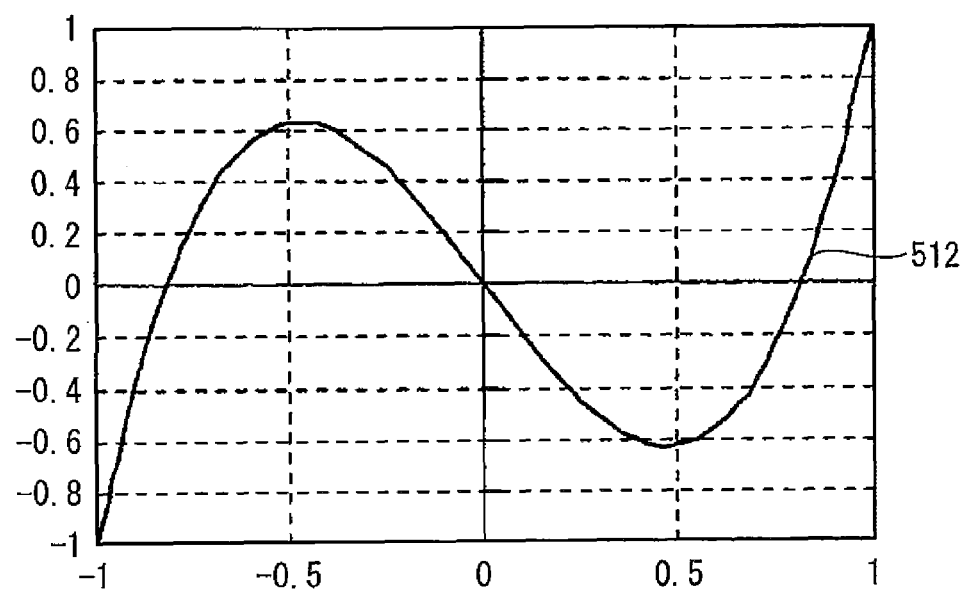

Wave front inclination and coma aberration resulting from tilt of the objective lens 4 are asymmetrical aberrations. Therefore, these components have a dependency on the incident direction of a light flux. For instance, in the case of coma aberration as illustrated in FIG. 5B, the incident plane is a plane in parallel to the plane of FIG. 5B. The incident direction of a light flux coincides with any incident direction. Therefore, coma aberration can be represented by a linear sum of $Z_8$ term and $Z_9$ term of Zernike coefficients.

First Embodiment

In this section, the first embodiment is described in detail. In the embodiment, the aberration correction device 3 includes a plurality of phase modulation elements, and the phase modulation elements are disposed along the optical axis.

As described above, symmetrical aberrations generated when the inside of a specimen is observed through an objective lens whose numerical aperture NA is large are complex aberrations including defocus, and low-order and high-order spherical aberration. Further, when off-axis aberrations are corrected, it is also necessary to correct asymmetrical aberrations. Therefore, in order to strictly correct the aberrations, the aberration correction device 3 is required to correct terms of high-order aberrations of symmetrical aberrations, and terms of asymmetrical aberrations. Accordingly, it is necessary to display phase modulation profiles representing these terms individually from each other. In view of the above, the aberration correction device 3 includes phase modulation element corresponding to each of the terms of these aberrations so as to display versatile phase modulation profiles, whereby it is possible to correct various aberrations.

However, preparing phase modulation elements for all the terms of Zernike polynomials and disposing these phase modulation elements along an optical axis may lower the transmittance due to reflection on the interfaces between the phase modulation elements.

In view of the above, it is preferable to set the number of phase modulation elements included in the aberration correction device to be equal to the number of minimum required terms. For instance, regarding on-axis aberrations, assuming that defocus is adjustable by focusing of a microscope, and high-order aberration is negligibly small, correcting $Z_{13}$ term representing first-order spherical aberration enhances the imaging performance. Further, regarding off-axis aberrations, correcting $Z_2$ term and $Z_3$ term representing tilt of an objective lens, and $Z_8$ term and $Z_9$ term representing coma aberration by the aberration correction device enhances the imaging performance. In other words, the aberration correction device 3 may include at least two phase modulation elements i.e. a phase modulation element for correcting symmetrical aberrations for $Z_{13}$ term of Zernike polynomials representing first-order spherical aberration, and a phase modulation element for correcting asymmetrical aberrations as complex aberrations of $Z_2$ term and $Z_3$ term representing tilt, and $Z_8$ term and $Z_9$ term representing coma aberration.

In the embodiment, as illustrated in FIG. 3, the aberration correction device 3 includes a phase modulation element 3a for correcting symmetrical aberrations, and a phase modulation element 3b for correcting asymmetrical aberrations. These two phase modulation elements are stacked along the optical axis. The order of disposing the phase modulation element 3a and the phase modulation element 3b is not limited. One of the phase modulation elements may be disposed on the objective lens 4 side. In the following, to simplify the description, the phase modulation element 3a for correcting symmetrical aberrations is referred to as a symmetrical aberration correction element, and the phase modulation element 3b for correcting asymmetrical aberrations is referred to as an asymmetrical aberration correction element.

A phase modulation profile to be displayed on the symmetrical aberration correction element 3a has polarities opposite to the polarities of a combined phase distribution obtained by adding, to a phase distribution of a first-order spherical aberration component, an appropriate component e.g. a defocus component whose PV value of a phase modulation amount is minimized as described above, i.e., has such polarities that the positive polarity and the negative polarity of the combined phase distribution are reversed in order to cancel the combined phase distribution.

Further, a high-order aberration component cannot be ignored when the inside of a specimen is observed through a lens whose numerical aperture NA is large. A phase distribution of actually generated aberrations may be a linear sum of first-order aberration and higher-order aberration. It may be insufficient to enhance the imaging performance of the laser microscope 100 only by correcting the first-order aberration by the aberration correction device 3. In view of the above, a phase modulation profile is created by inverting a weighted sum of first-order spherical aberration component and second-order spherical aberration component, i.e., by inverting a distribution obtained by adding a PV value to a sum of $Z_{13}$ term and $Z_{25}$ term in Zernike polynomials at a predetermined ratio. This allows for the aberration correction device 3 to correct the aberrations with high precision. An optimum ratio of a second-order spherical aberration component with respect to a first-order spherical aberration component differs depending on NA of the objective lens 4 and the types of objective lenses such as a dry lens, a water immersion lens, and a liquid immersion lens. Therefore, the ratio may be determined in accordance with the specifications of the objective lens 4.

A phase modulation profile to be displayed on the asymmetrical aberration correction element 3b has polarities opposite to the polarities of a combined phase distribution obtained by summing tilt, and first-order coma aberration and second-order coma aberration as asymmetrical aberrations at a predetermined ratio in order to cancel the combined phase distribution.

Figure 6A:
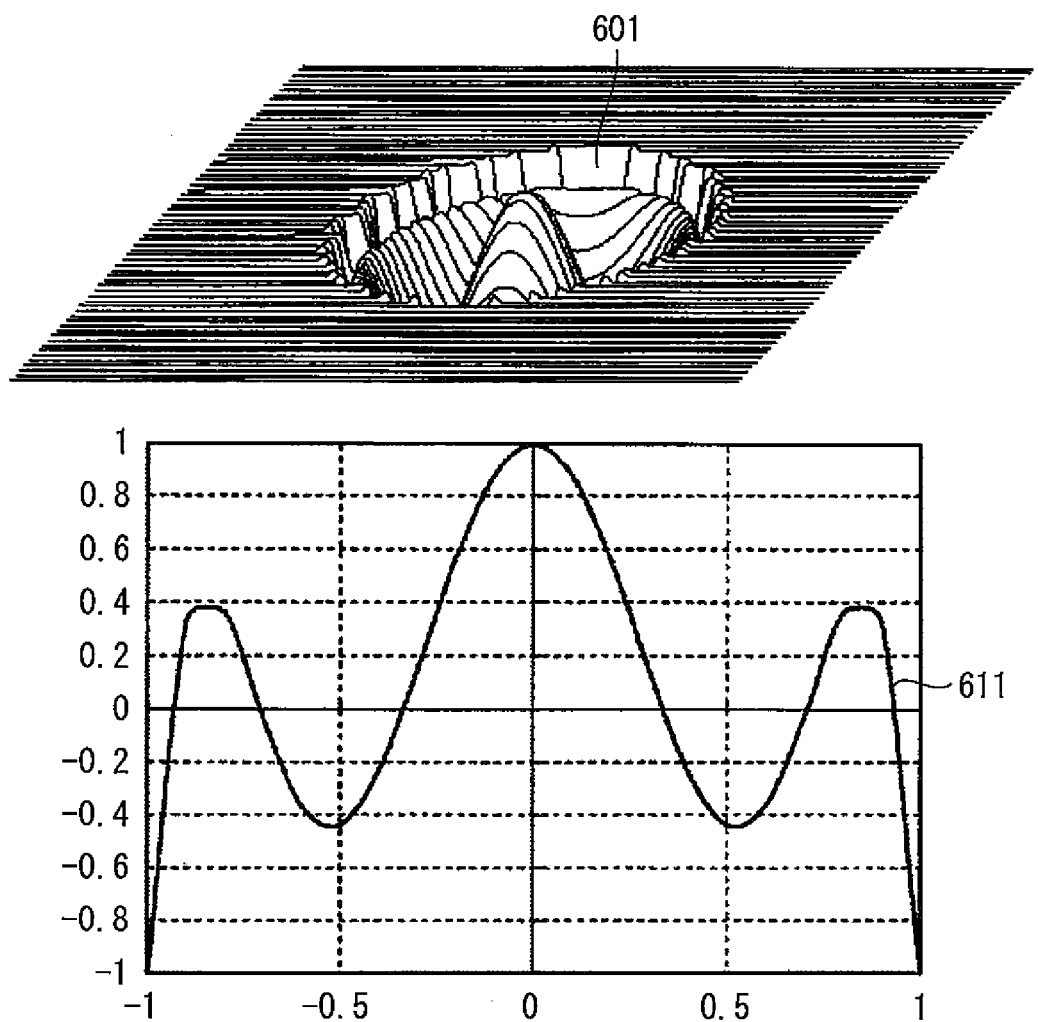
FIG. 6A is a three-dimensional perspective view of a phase distribution of second-order spherical aberration, and a diagram illustrating a partial sectional shape of the phase distribution in the form of a curve.
Figure 6B:
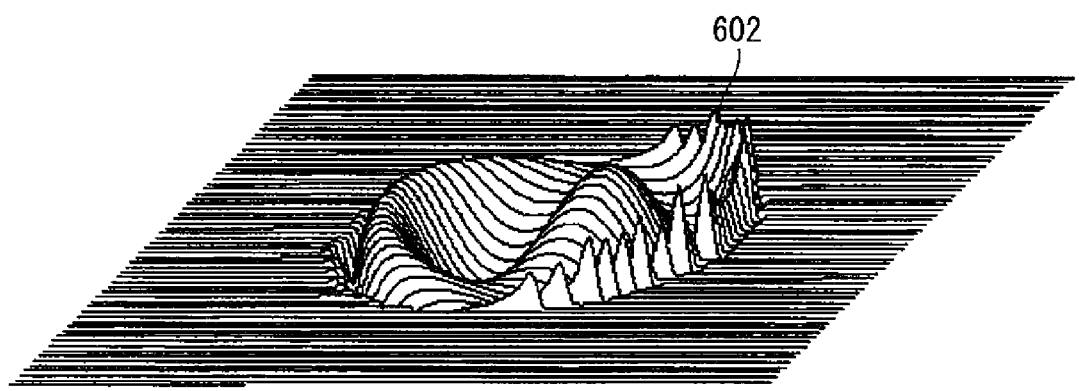
FIG. 6B is a three-dimensional perspective view of a phase distribution of second-order coma aberration, and a diagram illustrating a partial sectional shape of the phase distribution in the form of a curve.
Figure 6B:
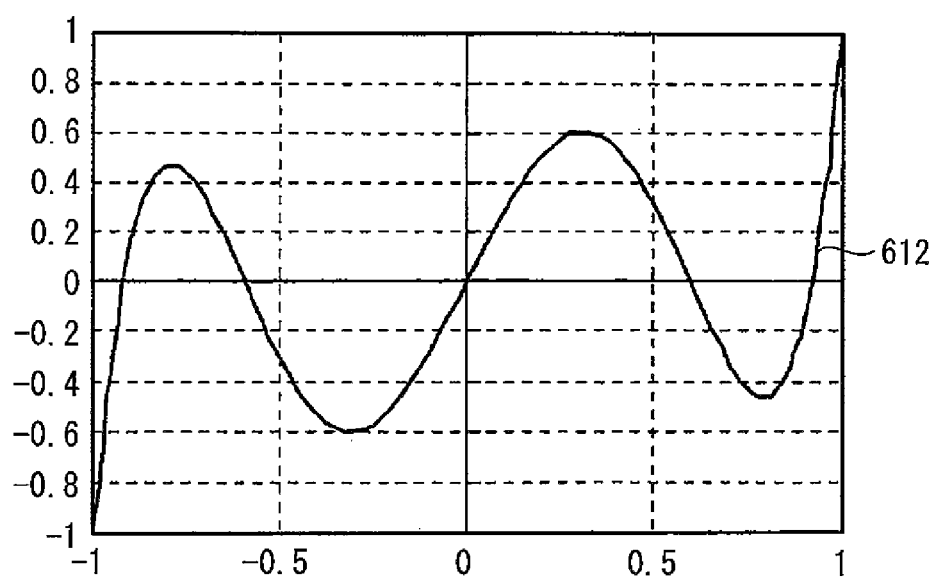

The ratio of a coefficient to be applied to second-order coma aberration with respect to a coefficient to be applied to first-order coma aberration illustrated in FIG. 5B and FIG. 6B may be determined in accordance with the specifications of the objective lens 4, as well as symmetrical aberrations. Further, when the position of the confocal pinhole 8 of the laser microscope 100 is variable, as well as defocus as symmetrical aberrations, a phase modulation profile may be set in such a manner that the PV value of a phase distribution is minimized by adding a tilt component to a combined phase distribution.

Figure 2:
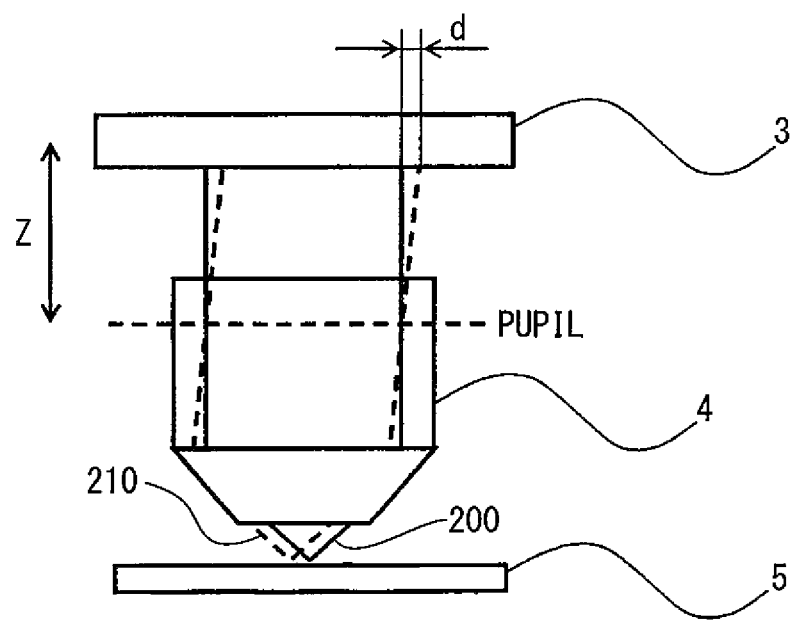
FIG. 2 is a schematic diagram illustrating a relationship between an objective lens and an aberration correction device for representing a cause of aberrations generated in an off-axis condition.

Further, as illustrated in FIG. 2, regarding off-axis aberrations, in the aberration correction device 3, the incident position of an off-axis light flux is deviated from the incident position of a light flux focused on the optical axis by the distance d on a plane orthogonal to the optical axis due to oblique incidence of the light flux. When a positional deviation amount between a phase distribution of generated aberrations and a phase modulation profile for correcting the phase distribution is very small, the difference can be represented by differentiation of the phase distribution of aberrations. Therefore, when spherical aberration is corrected, residual aberrations that remain after the correction are represented as a differentiation pattern of a spherical aberration pattern. Accordingly, the residual aberrations can be approximated by a coma aberration pattern. For instance, it is possible to approximate residual aberrations due to positional deviation between a phase distribution of first-order spherical aberration and a phase modulation profile to be displayed on the aberration correction device 3 by first-order coma aberration. Further, it is possible to approximate residual aberrations due to positional deviation between a phase distribution of second-order spherical aberration and a phase modulation profile to be displayed on the aberration correction device 3 by second-order coma aberration.

Therefore, the ratio of each order of asymmetrical aberrations due to positional deviation between a phase distribution representing aberrations and a phase modulation profile is calculated from the ratio of each order of symmetrical aberrations. In view of the above, an asymmetrical aberration pattern as a reference in calculating a phase modulation profile for use in correcting off-axis aberrations may be determined by summing asymmetrical aberrations corresponding to a positional deviation amount calculated with use of the ratios, and asymmetrical aberrations generated by the viewing angle.

A generated aberration amount is proportional to the viewing angle in both of first-order coma aberration and second-order coma aberration. Further, the viewing angle increases toward the periphery of the view field. Therefore, generated coma aberration also increases, as the viewing angle increases. In view of the above, it is possible to determine a phase modulation profile to be displayed on the aberration correction device 3 by calculating generated aberrations based on the viewing angle, and in such a manner as to cancel the phase distribution of the generated aberrations. When an observation plane to be defined on the specimen 5 is represented by spherical coordinates, the ratio of $Z_9$ term with respect to $Z_8$ term in Zernike coefficients is determined depending on the azimuth θ, and a weighted sum of these terms is obtained in accordance with the ratio. Further, changing the phase modulation amount in proportion to a radius vector r makes it possible to create a phase modulation profile suitable for the viewing angle. In this way, it is preferable to change the modulation amount of a phase modulation profile to be displayed on the aberration correction device 3 in synchronization with laser scanning. The laser microscope 100 is configured to change a scan range in such a manner that the operator can enlarge and observe an area as intended by the operator. Therefore, determining the phase modulation amount based on the center of the observation area makes it possible to ignore a change in asymmetrical aberrations in the scan range. Accordingly, when the response speed of the aberration correction device 3 is insufficient relative to the scan speed of a laser, the aberration correction device 3 can sufficiently obtain the correction effects without changing the phase modulation amount in proportion to the radius vector r.

As described above, the aberration correction device 3 is constituted by stacking two phase modulation elements i.e. the symmetrical aberration correction element 3a and the asymmetrical aberration correction element 3b. Therefore, the aberration correction device 3 can correct various generated aberrations, for instance, higher-order aberrations, or aberrations other than spherical/symmetrical aberrations such as coma aberration. Obtaining a phase modulation profile based on complex aberrations, which is a sum of aberrations of n types, makes it possible to partially cancel the aberrations, whereby it is possible to reduce a total phase modulation amount to a sufficiently small modulation amount, as compared with n multiple of each of the aberration correction amounts. In this way, it is possible to reduce a maximum phase modulation amount required for a phase modulation element.

The phase modulation element in the aberration correction device may be a liquid crystal element. In view of the above, in the following, a method for applying a voltage to an electrode in a liquid crystal element when a phase distribution that cancels wave front aberrations is displayed on the liquid crystal element as a phase modulation profile is described in detail, referring to FIG. 8 to FIG. 11.

Figure 8:
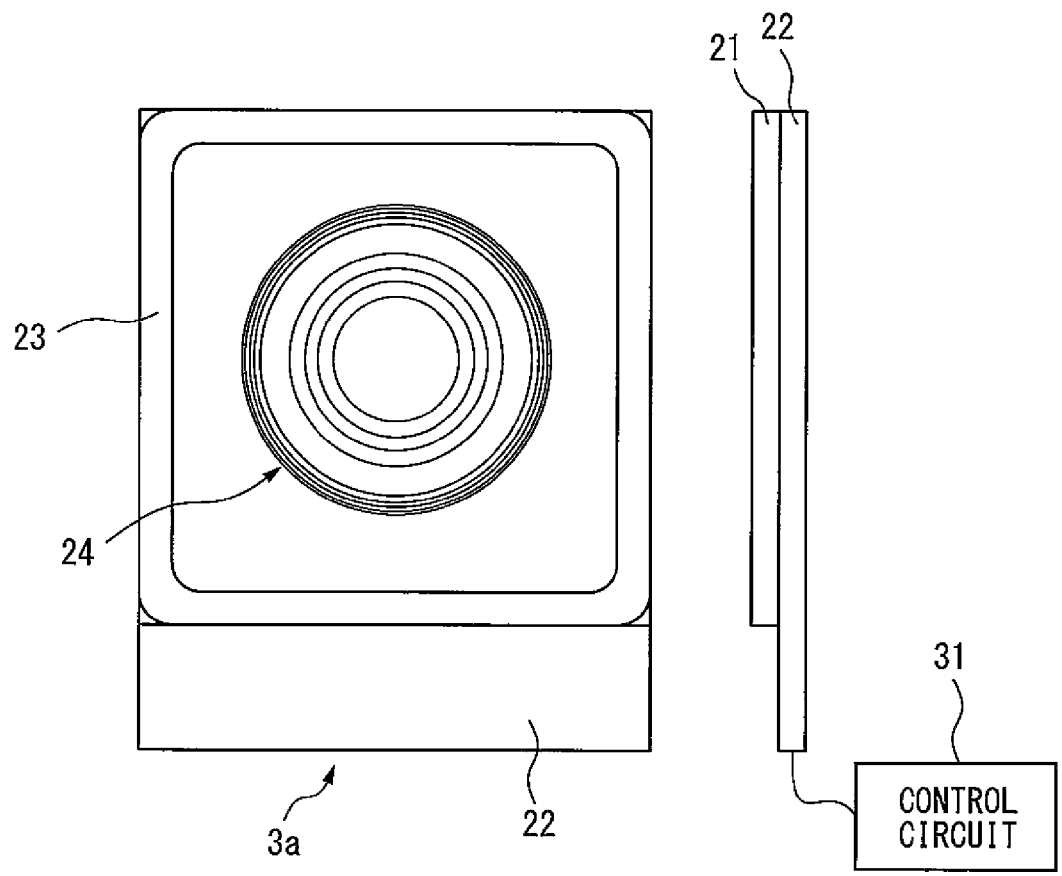
FIG. 8 is a plan view and a side view of a symmetrical aberration correction element in the aberration correction device.

FIG. 8 is a plan view and a side view of the symmetrical aberration correction element 3a in the aberration correction device 3. A liquid crystal layer of the symmetrical aberration correction element 3a is sandwiched between transparent substrates 21 and 22, and the periphery of the liquid crystal layer is sealed by a sealing member 23 so as to prevent leakage of liquid crystal. The size of an active region 24 that drives the liquid crystal, i.e., the size of a region capable of modulating the phase of a transmitting light flux, on surfaces of the transparent substrates 21 and 22 disposed to face each other, is determined in accordance with the pupil diameter of the objective lens 4. Further, a plurality of transparent annular electrodes are formed in the active region 24 to be concentric with respect to the optical axis so as to correct the symmetrical aberrations. One of the transparent substrates 21 and 22 may be formed to cover the entirety of the active region 24. Controlling the voltages to be applied to the transparent annular electrodes by a control circuit 31 in the aberration correction device 3 makes it possible to impart a light flux passing through the symmetrical aberration correction element 3a with an intended phase distribution. The control circuit 31 includes, for instance, a processor, and a drive circuit capable of changing the voltages to be output in accordance with a drive signal from the processor.

Figure 9:
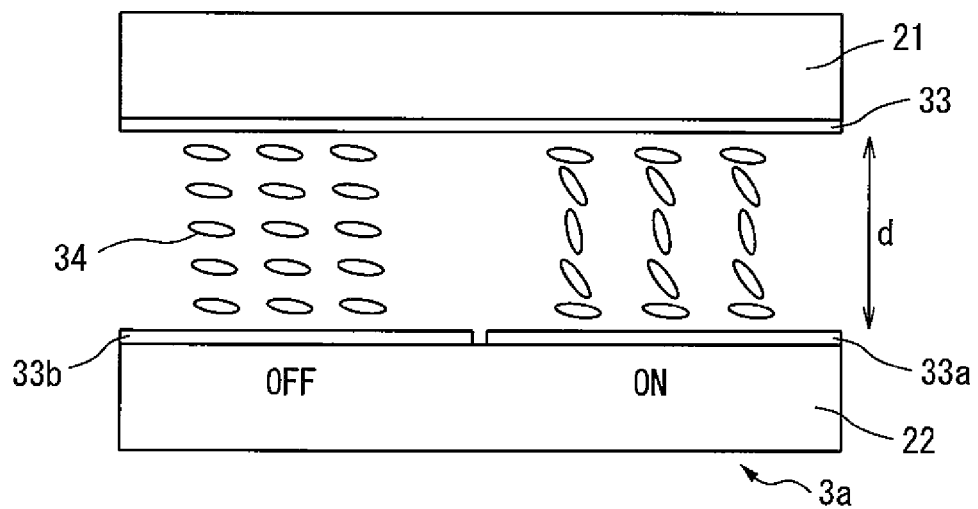
FIG. 9 is a schematic sectional view of a part of an active region of the symmetrical aberration correction element illustrated in FIG. 8.

FIG. 9 is a sectional schematic view of a part of the active region 24 of the symmetrical aberration correction element 3a in FIG. 8. In the symmetrical aberration correction element 3a, liquid crystal molecules 34 are sandwiched between the transparent substrates 21 and 22. Transparent electrodes 33, 33a, and 33b are formed on the surfaces of the transparent substrates 21 and 22 disposed to face each other. FIG. 9 illustrates a state that a voltage is applied between the electrode 33a on the right half side and the electrode 33, and a voltage is not applied between the electrode 33b on the left half side and the electrode 33. The liquid crystal molecules 34 have an elongated molecular structure, and are homogeneously aligned. Specifically, the liquid crystal molecules 34 sandwiched between the two substrates 21 and 22 are aligned to be parallel to each other in the major axis direction thereof, and are aligned in parallel to an interface between each of the substrates 21 and 22 and the liquid crystal layer. In the liquid crystal molecules 34, the refractive index thereof in the major axis direction and the refractive index thereof in a direction orthogonal to the major axis direction differ from each other. Generally, the refractive index $n_e$ with respect to a polarized component (extraordinary ray) in parallel to the major axis direction of the liquid crystal molecules 34 is higher than the refractive index $n_o$ with respect to a polarized component (ordinary ray) in parallel to the minor axis direction of the liquid crystal molecules. Therefore, the symmetrical aberration correction element 3a configured such that the liquid crystal molecules 34 are homogeneously aligned acts as a uni-axial birefringent element.

Liquid crystal molecules have a dielectric anisotropy, and generally, a force is exerted on the liquid crystal molecules such that the major axis of the liquid crystal molecules is aligned with the electric field direction. In other words, as illustrated in FIG. 9, when a voltage is applied between the electrodes provided in the two substrates for sandwiching the liquid crystal molecules therebetween, the major axis direction of the liquid crystal molecules is inclined from a state in parallel to the substrates toward a direction orthogonal to the surfaces of the substrates in accordance with the voltage. The refractive index $n_\phi$ of the liquid crystal molecules with respect to a light flux of a polarized component in parallel to the major axis of the liquid crystal molecules is represented by: $n_o \leq n_\phi \leq n_e$ (where $n_o$ is the refractive index of ordinary light, and $n_e$ is the refractive index of extraordinary light). Therefore, assuming that the thickness of the liquid crystal layer is d, an optical path length difference Δnd ($=n_\phi d - n_o d$) is generated between the light flux passing through a region where a voltage is applied, and the light flux passing through a region where a voltage is not applied in the liquid crystal layer. The phase difference is $2\pi \Delta n d / \lambda$, where λ is the wavelength of a light flux incident on the liquid crystal layer.

As described above, the laser microscope 100 may include a plurality of laser light sources configured to output laser light whose wavelengths are different from each other. In the above configuration, a required phase modulation amount differs depending on the wavelength. Therefore, the control circuit 31 in the aberration correction device 3 is capable of correcting a deviation in the phase modulation amount due to a wavelength difference by changing the voltage to be applied to the liquid crystal layer of the symmetrical aberration correction element 3a. Further, the control circuit 31 is capable of cancelling a deviation in the phase modulation amount due to a temperature change by adjusting the voltage to be applied to the liquid crystal layer of the symmetrical aberration correction element 3a.

Next, a method for imparting an intended phase distribution to a light flux passing through the symmetrical aberration correction element 3a and through the asymmetrical aberration correction element 3b constituted as liquid crystal elements is described in detail. First of all, a phase modulation profile to be displayed on the symmetrical aberration correction element 3a is determined, and a pattern of each of the annular electrodes is determined by dividing the phase modulation profile at a fixed phase interval. Likewise, a phase modulation profile to be displayed on the asymmetrical aberration correction element 3b is determined, and a pattern of each of the annular electrodes is determined by dividing the phase modulation profile at a fixed phase interval.

Figure 10:
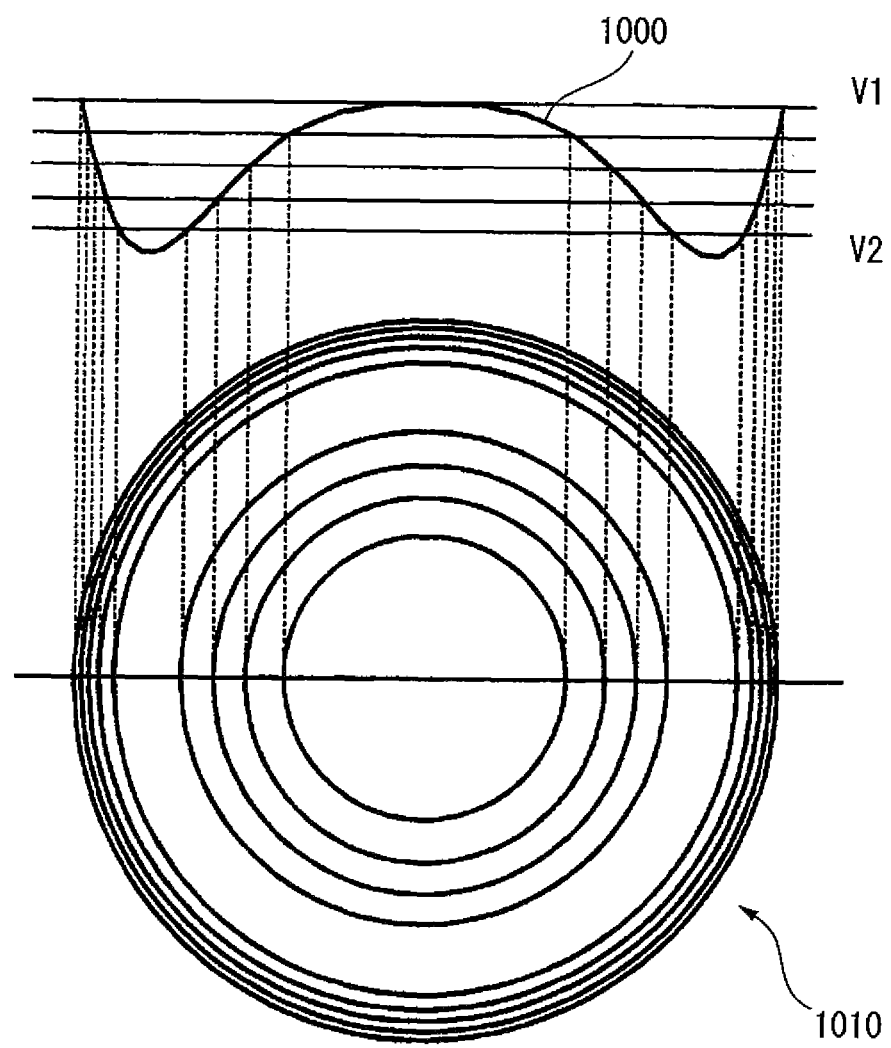
FIG. 10 is a diagram illustrating an example of an electrode pattern to be determined in accordance with a phase distribution of a phase modulation profile that cancels symmetrical aberrations by the symmetrical aberration correction element.

FIG. 10 is a diagram illustrating an example of an electrode pattern to be determined in accordance with a phase distribution of a phase modulation profile that cancels symmetrical aberrations by the symmetrical aberration correction element 3a. A curve 1000 on the upper side in FIG. 10 represents a sectional view of a phase modulation profile corresponding to a plane passing through the optical axis. On the lower side of FIG. 10, there are illustrated annular electrodes 1010, for each of which an applied voltage is determined in accordance with the phase modulation profile. The bold lines in FIG. 10 illustrate spaces between the annular electrodes. Lead-out electrodes and other elements are not illustrated to simplify the illustration. Applying a voltage to each of the annular electrodes by the control circuit 31 in such a manner that a voltage difference between the adjacent annular electrodes corresponds to a fixed step in a voltage range, in which characteristics of the phase modulation amount to be imparted to a light flux passing through the symmetrical aberration correction element 3a with respect to the applied voltage is substantially linear, allows for the aberration correction device 3 to display, on the symmetrical aberration correction element 3a, a phase modulation profile, in which an intended phase distribution is quantized.

In order to apply a voltage to each of the annular electrodes in such a manner that the voltage difference between the adjacent annular electrodes corresponds to a fixed step, the annular electrodes at the position where the phase modulation amount is maximum and at the position where the phase modulation amount is minimum are determined from the phase modulation profile. The control circuit 31 applies a voltage giving the maximum phase modulation amount, and a voltage giving the minimum phase modulation amount to the corresponding annular electrodes, respectively. Further, the annular electrodes adjacent to each other are connected by an electrode (a resistor) having a fixed electrical resistance. Therefore, the voltage difference between the annular electrodes adjacent to each other corresponds to a fixed step by resistance division. Further, controlling the applied voltages as described above is advantageous in simplifying the configuration of the control circuit 31, as compared with a drive circuit configured to control voltages to be applied to the annular electrodes independently of each other.

Figure 11:
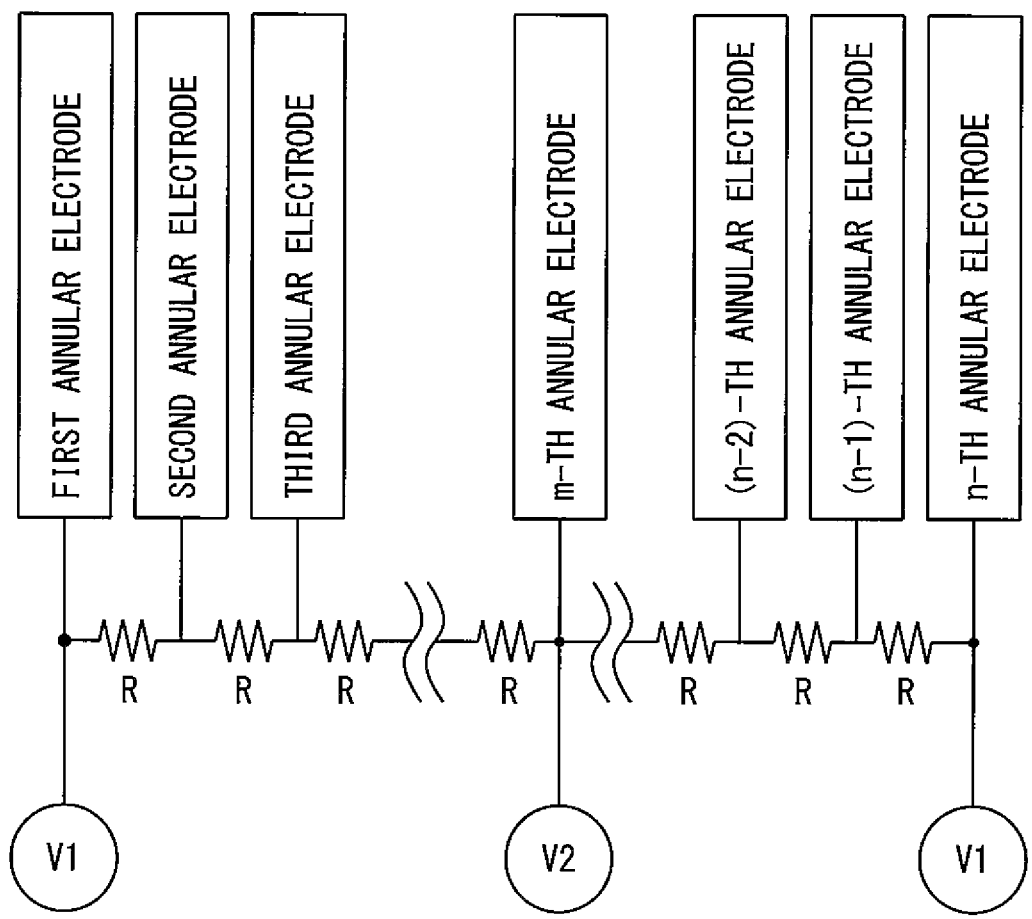
FIG. 11 is a diagram illustrating a relationship between annular electrodes and voltages to be applied when the symmetrical aberration correction element includes n annular electrodes.

FIG. 11 is a diagram illustrating a relationship between annular electrodes and applied voltages to be applied thereto when the symmetrical aberration correction element 3a has n annular electrodes. In FIG. 11, the center electrode is referred to as the first annular electrode, the outermost peripheral annular electrode is referred to as the n-th annular electrode, and the annular electrode to which a maximum voltage is applied is referred to as the m-th annular electrode.

FIG. 11 illustrates annular electrodes to which voltages are applied by the control circuit 31 by 2-level driving. A voltage V1 is applied to the first annular electrode at the center and to the n-th annular electrode at the outermost periphery, and a voltage V2 is applied to the m-th annular electrode. Selecting a defocus value in such a manner that the phase modulation amounts at the center and at the end in a phase distribution of generated wave front aberrations are equal to each other makes it possible to match the phase modulation amount at the center electrode with the phase modulation amount at the outermost peripheral electrode. As a result of the above control, the voltage applied to the center electrode is made equal to the voltage to be applied to the n-th annular electrode at the outermost periphery. Further, applying the voltages to the symmetrical aberration correction element 3a as described above by the control circuit 31 makes it possible to minimize the PV value. In this way, in the example of 2-level driving, it is possible to vary the amplitude of the phase modulation amount without changing the relative ratio of the phase modulation profile, with use of a difference between the applied voltages V1 and V2. Further, the above driving method has a feature that the phase modulation profile has a fixed shape, regardless of the advantage that the number of levels of the voltage values to be directly applied to the annular electrodes by the control circuit 31 is only two.

Next, the asymmetrical aberration correction element 3b is described. The structure of the symmetrical aberration correction element 3a and the structure of the asymmetrical aberration correction element 3b may be made identical to each other except for a transparent electrode pattern to be formed. Therefore, regarding the structure of the asymmetrical aberration correction element 3b except for the transparent electrode pattern, the description about the symmetrical aberration correction element 3a is to be referred to. Preferably, the size of an active region of the asymmetrical aberration correction element 3b, i.e., the size of a region in which the phase of a light flux to be transmitted can be modulated may be larger than the size of the pupil of the objective lens 4. The reason is such that in the laser microscope 100, in view of a point that the asymmetrical aberration correction element 3b is disposed at a position different from the pupil position of the objective lens 4, a light flux in accordance with the maximum viewing angle is transmitted through the asymmetrical aberration correction element 3b at a position away from the optical axis in accordance with the maximum viewing angle and the distance from the pupil of the objective lens 4 to the asymmetrical aberration correction element 3b.

Figure 12:
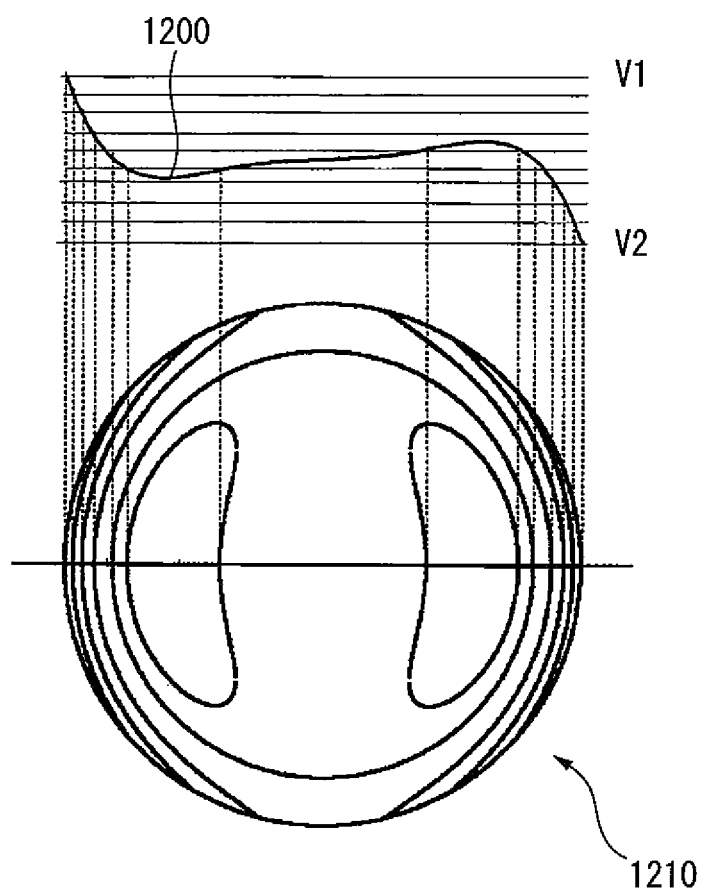
FIG. 12 is a diagram illustrating an example of an electrode pattern to be determined in accordance with a phase distribution of a phase modulation profile that cancels asymmetrical aberrations by an asymmetrical aberration correction element.

FIG. 12 is a diagram illustrating an example of an electrode pattern to be determined in accordance with a phase distribution of a phase modulation profile that cancels coma aberration as asymmetrical aberrations by the asymmetrical aberration correction element 3b. A curve 1200 on the upper side in FIG. 12 represents a sectional view of a phase modulation profile corresponding to a plane passing through the optical axis. On the lower side of FIG. 12, there are illustrated electrodes 1210 for coma aberration, for each of which an applied voltage is determined in accordance with the phase modulation profile. The bold lines in FIG. 12 illustrate spaces between annular electrodes, and lead-out electrodes and other elements are not illustrated to simplify the illustration, as well as the configuration of FIG. 10.

As illustrated in FIG. 12, also in the case of a phase modulation profile for correcting asymmetrical aberrations, as well as the electrode structure to be determined in accordance with a phase modulation profile for correcting symmetrical aberrations, an electrode pattern is determined so that a voltage difference between adjacent annular electrodes corresponds to a fixed step, i.e., a difference in phase modulation amount to be imparted by two annular electrodes adjacent to each other corresponds to a fixed step. The control circuit 31 applies a voltage giving a maximum phase modulation amount and a voltage giving a minimum phase modulation amount to the corresponding electrodes, respectively. Further, the electrodes adjacent to each other are connected by an electrode (a resistor) having a fixed electrical resistance. Therefore, the voltage to be applied to each of the other electrodes is determined by resistance division, and a phase modulation amount in accordance with the applied voltage is imparted to a light flux. According to the above configuration, the asymmetrical aberration correction element 3b is operable to display a phase modulation profile for correcting asymmetrical aberrations.

Regarding asymmetrical aberrations, it is possible to minimize the PV value of a phase distribution on a plane by adding a tilt component, in place of a defocus amount to be added when symmetrical aberrations are corrected. Further, it is possible to minimize the modulation range required for the asymmetrical aberration correction element 3b.

A phase distribution of asymmetrical aberrations differs depending on the objective lens. In view of the above, a phase distribution of asymmetrical aberrations is obtained by calculating an optical path in accordance with a lens to be used as the objective lens 4 in the laser microscope 100. The phase distribution of asymmetrical aberrations is represented as a linear sum of a tilt component and a coma aberration component. The order of coma aberration to be corrected out of the coma aberration component is determined depending on the numerical aperture NA of the objective lens 4 or an observation condition of a specimen. Further, asymmetrical aberrations have directionality. In view of the above, it is preferable to display two phase distributions along directions orthogonal to each other in order to represent a phase modulation profile for correcting any asymmetrical aberrations by the asymmetrical aberration correction element 3b. In view of the above, the asymmetrical aberration correction element 3b may include two liquid phase elements having electrode patterns identical to each other, and the two liquid crystal elements may be stacked in such a manner that the electrode patterns are disposed to be orthogonal to each other. Alternatively, two electrode patterns to be formed while sandwiching a liquid crystal layer of the asymmetrical aberration correction element 3b therebetween may be disposed to be orthogonal to each other.

Second Embodiment

In this section, the second embodiment is described in detail. A configuration of an aberration correction device in the embodiment is described referring to FIG. 13 to FIG. 15. The constituent elements in the second embodiment identical or equivalent to the constituent elements in the first embodiment are indicated with the same reference numerals as the reference numerals of the corresponding constituent elements. In the following, the different points with respect to the first embodiment are described. Regarding the constituent elements other than the different constituent elements, the description about the corresponding constituent elements in the first embodiment is referred to.

In the first embodiment, the aberration correction device includes a symmetrical aberration correction element for correcting symmetrical aberrations, and an asymmetrical aberration correction element for correcting asymmetrical aberrations. In the second embodiment, symmetrical aberrations and asymmetrical aberrations are corrected by one phase modulation element.

Figure 13:
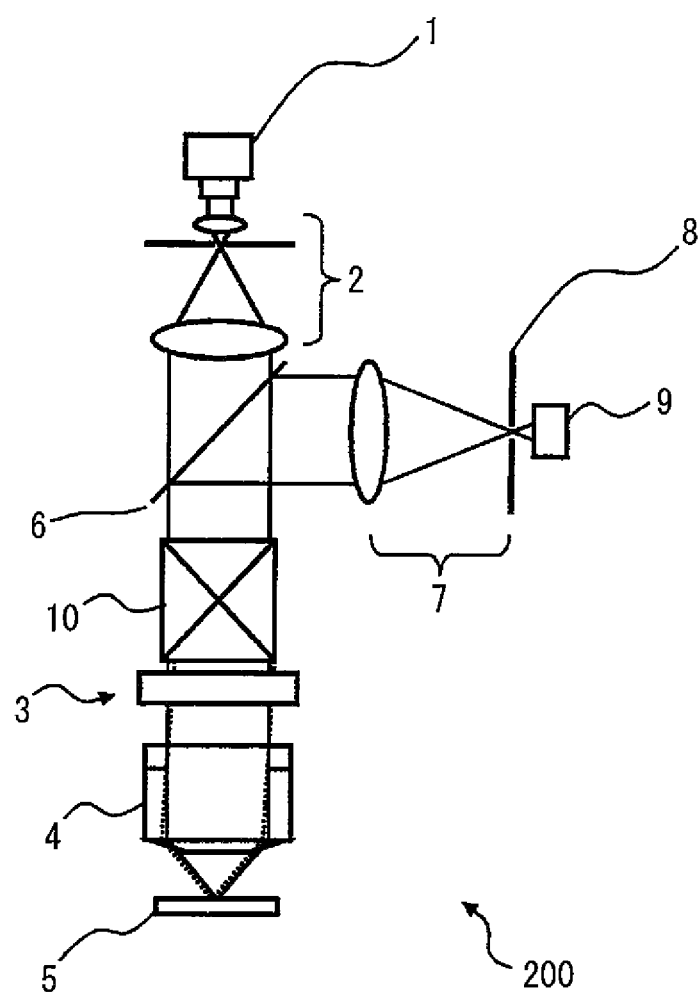
FIG. 13 is a schematic configuration diagram of a laser microscope according to another embodiment of the invention.

FIG. 13 is a schematic configuration diagram of a laser microscope 200 according to the second embodiment. The second embodiment is different from the first embodiment in that an aberration correction device 3 includes only one phase modulation element. Adjusting the voltages to be applied to electrodes provided in the phase modulation element by a control circuit 31 provided in the aberration correction device 3 makes it possible to display a phase modulation profile for correcting symmetrical aberrations or a phase modulation profile for correcting asymmetrical aberrations on the phase modulation element. The configuration of the laser microscope 200 other than the aberration correction device 3 is the same as the configuration of the laser microscope 100 illustrated in FIG. 3. Therefore, the description about the laser microscope 200 itself is omitted herein.

The phase modulation element in the embodiment may be a liquid crystal element having a configuration as illustrated in FIG. 8 and FIG. 9, as well as the phase modulation element in the first embodiment. A pattern of transparent electrodes to be disposed while sandwiching a liquid crystal layer therebetween is different from the transparent electrode pattern of the phase modulation element in the first embodiment. In view of the above, in the following, a transparent electrode pattern of the phase modulation element, and voltages to be applied to each of the transparent electrodes are described.

Figure 14A:
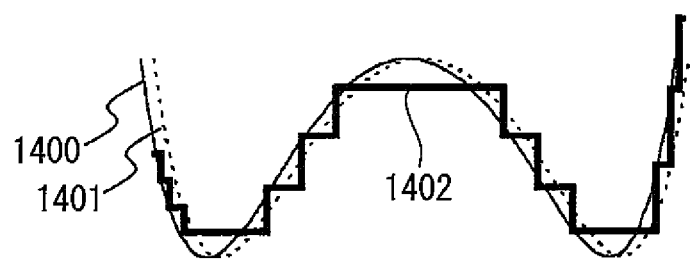
FIG. 14A is a diagram illustrating an example of a phase modulation profile to be displayed on a phase modulation element in the second embodiment.
Figure 14B:
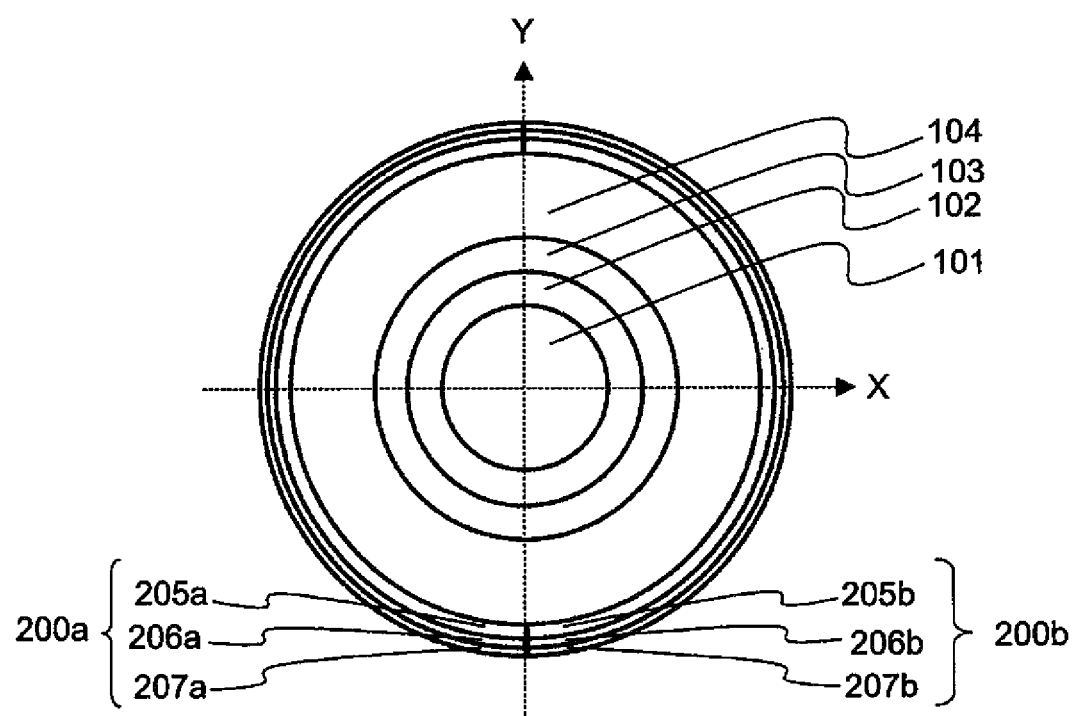
FIG. 14B is a diagram illustrating an example of an electrode pattern of the phase modulation element in the second embodiment.

An electrode pattern to be determined in accordance with a phase distribution of a phase modulation profile that cancels wave front aberrations in the phase modulation element of the second embodiment is described, referring to FIGS. 14A and 14B.

In FIG. 14A, a curve 1400 indicated by the solid line represents a phase modulation profile for correcting asymmetrical aberrations generated when a light flux is incident obliquely on an objective lens 4 in accordance with the viewing angle. The phase modulation profile corresponds to a phase distribution of aberrations generated with respect to an obliquely incident light flux at the position of the aberration correction device, and represents a pattern corresponding to asymmetrical aberrations. Further, a curve 1401 indicated by the dotted line represents a pattern of a phase modulation profile with respect to a light flux along the optical axis at the position of the phase modulation element. Due to a difference between the pupil position of the objective lens and the position of the phase modulation element, the center of a phase modulation profile (curve 1401) for correcting aberrations generated with respect to a light flux along the optical axis, and the center of a phase modulation profile (curve 1400) for correcting aberrations generated with respect to an obliquely incident light flux are deviated in X-axis direction. As a result of the deviation, the aberrations generated with respect to an obliquely incident light flux turn into asymmetrical aberrations along X-axis direction.

FIG. 14B is a plan view illustrating disposition of the transparent electrodes in the embodiment. The bold lines in FIG. 14B illustrate spaces between annular electrodes, and lead-out electrodes and other elements are not illustrated to simplify the illustration, as well as the configuration of FIG. 10. As illustrated in FIG. 14B, the phase modulation element includes annular electrodes 101 to 104 formed to be concentric with respect to the optical axis, and electrodes 200a and 200b in the form of a semi circular arc, which are formed on the outside of the annular electrodes 101 to 104. The electrode 200a and the electrode 200b are linearly symmetrical with respect to a line (Y-axis in FIG. 14B) passing through the optical axis. The electrode 200a and the electrode 200b respectively include three semi-annular electrodes 205a to 207a, and three semi-annular electrodes 205b to 207b in the form of a semi-circular arc.

When symmetrical aberrations with respect to a light flux focused on the optical axis are corrected, applying a voltage to the annular electrodes 101 to 104 illustrated in FIG. 14B, and applying the same voltage as each other to the semi-annular electrodes 205a to 207a, and to the semi-annular electrodes 205b to 207b which are respectively linearly symmetrical to the semi-annular electrodes 205a to 207a with respect to Y-axis by the control circuit 31 makes it possible to form a phase that is symmetrical with respect to the optical axis. Further, when asymmetrical aberrations with respect to a light flux obliquely incident on the objective lens 4 are corrected, applying voltages different from each other to the semi-annular electrodes 205a to 207a, and to the semi-annular electrodes 205b to 207b which are respectively linearly symmetrical to the semi-annular electrodes 205a to 207a with respect to Y-axis by the control circuit 31 makes it possible to display a phase modulation profile asymmetrical with respect to Y axis on the phase modulation element. A line 1402 in FIG. 14A is an example of a phase modulation profile for correcting asymmetrical aberrations with respect to an obliquely incident light flux, which is obtained by adjusting the voltages to be applied to the electrodes illustrated in FIG. 14B.

As described above, setting a voltage to be applied to each of the semi-annular electrodes 205a to 207a, and a voltage to be applied to each of the semi-annular electrodes 205b to 207b which are respectively linearly symmetrical to the semi-annular electrodes 205a to 207a with respect to Y-axis to be equal to each other by the control circuit 31 allows for the aberration correction device 3 to correct symmetrical aberrations. On the other hand, setting a voltage to be applied to each of the semi-annular electrodes 205a to 207a, and a voltage to be applied to each of the semi-annular electrodes 205b to 207b which are respectively linearly symmetrical to the semi-annular electrodes 205a to 207a with respect to Y-axis to be different from each other by the control circuit 31 allows for the aberration correction device 3 to correct asymmetrical aberrations along X-axis direction. In other words, the aberration correction device 3 is capable of easily switching an object to be corrected between symmetrical aberrations and asymmetrical aberrations by changing a voltage application method with respect to the transparent electrodes of the phase modulation element. For instance, in laser scanning by the laser microscope 200, changing the voltage application method with respect to the transparent electrodes of the phase modulation element between when a light flux is obliquely incident on the objective lens 4 and when a light flux is incident in parallel to the optical axis allows for the aberration correction device 3 to implement aberration correction optimum for any light flux.

Figure 15:
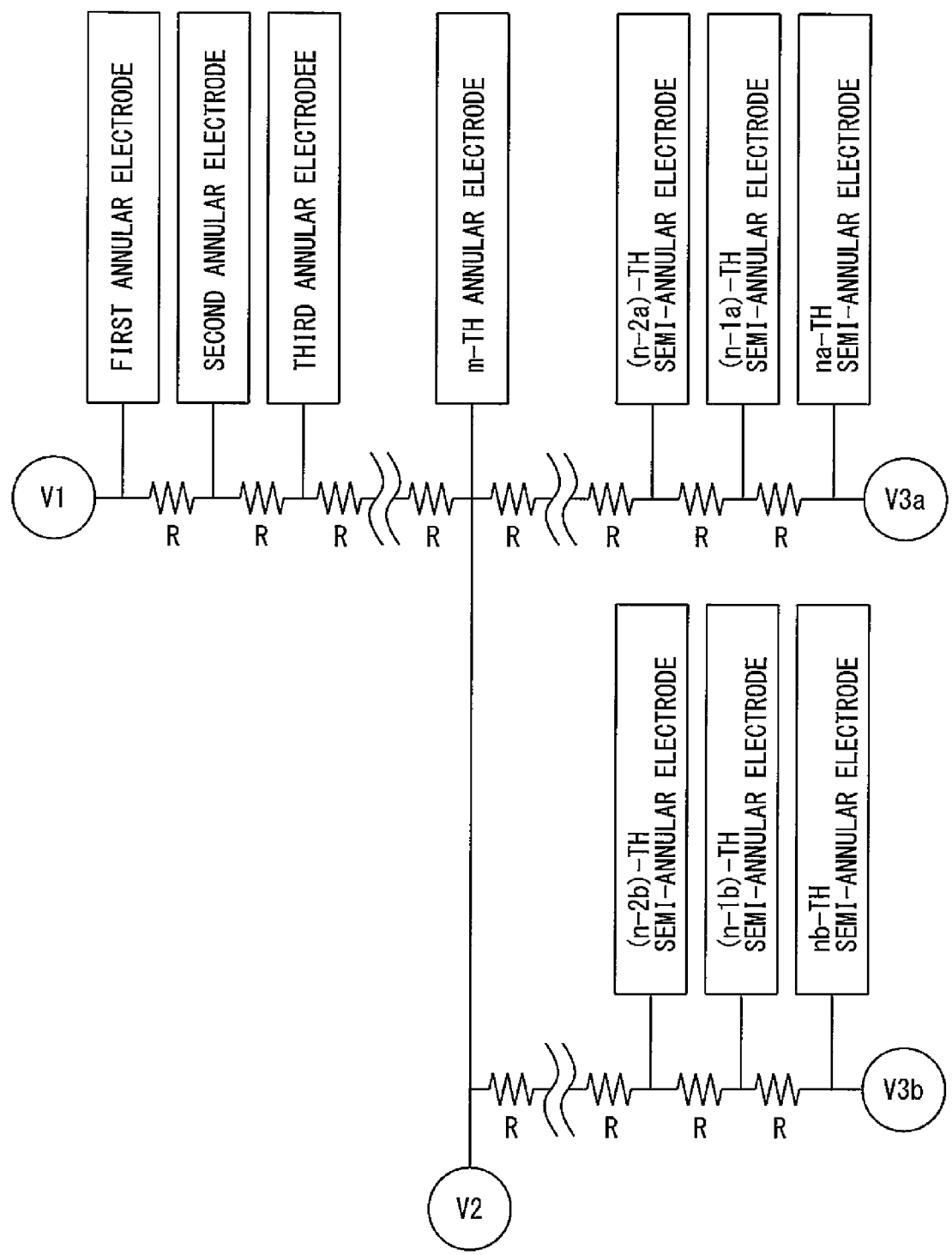
FIG. 15 is a diagram illustrating an example of electrodes to which voltages are applied by a control circuit in an aberration correction device according to the second embodiment.

FIG. 15 is a diagram illustrating an example of electrodes to which voltages are applied by the control circuit 31 among the annular electrodes and semi-annular electrodes illustrated in FIG. 14B by 4-level driving. In FIG. 15, the center electrode 101 is referred to as the first annular electrode, and the annular electrode to which a maximum voltage is applied is referred to as the m-th annular electrode. Further, the two outermost peripheral semi-annular electrodes 207a and 207b are respectively referred to as the na-th semi-annular electrode and the nb-th semi-annular electrode, and the semi-annular electrodes on the inner side of the two outermost peripheral semi-annular electrodes are respectively referred to as the (n−1a)-th semi-annular electrode and the (n−1b)-th semi-annular electrode, and the (n−2a)-th semi-annular electrode and the (n−2b)-th semi-annular electrode in the order from the outside. As well as the first embodiment, for the annular electrodes and the semi-annular electrodes, each two annular electrodes adjacent to each other are connected by an electrode (a resistor) having a fixed electrical resistance, and the voltage difference between each two annular electrodes or semi-annular electrodes adjacent to each other corresponds to a fixed step by resistance division.

The control circuit 31 applies a voltage V1 to the first annular electrode at the center, applies a voltage V2 to the m-th annular electrode, applies a voltage V3a to the na-th semi-annular electrode as the outermost peripheral semi-annular electrode 207a, and applies a voltage V3b to the nb-th semi-annular electrode as the outermost peripheral semi-annular electrode 207b. In this way, using 4 voltage levels to be controlled independently of each other by the control circuit 31 makes it possible to display an optimum phase modulation profile on the phase modulation element. As described above, when a phase modulation profile symmetrical with respect to the optical axis is displayed on the phase modulation element, the control circuit 31 may set the voltages V3a and V3b to be equal to each other. On the other hand, when a phase modulation profile asymmetrical with respect to the optical axis is displayed on the phase modulation element, the control circuit 31 may set the voltages V3a and V3b to be different from each other.

Third Embodiment

In this section, the third embodiment is described in detail. A configuration and movement processing of an aberration correction device according to the embodiment are described referring to FIG. 16A, FIG. 16B, and FIG. 17. The constituent elements in the third embodiment identical or equivalent to the constituent elements in the second embodiment are indicated with the same reference numerals as the reference numerals of the corresponding constituent elements. In the following, the different points with respect to the first embodiment and the second embodiment are described. Regarding the constituent elements other than the different constituent elements, the description about the corresponding constituent elements in the first or second embodiment is referred to.

As well as the second embodiment, the aberration correction device according to the third embodiment is configured such that symmetrical aberrations and asymmetrical aberrations are corrected by one phase modulation element. As compared with the phase modulation element in the second embodiment, the aberration correction device according to the third embodiment is configured such that each of annular electrodes provided in the phase modulation element is divided into two semi-annular electrodes.

Figure 16A:
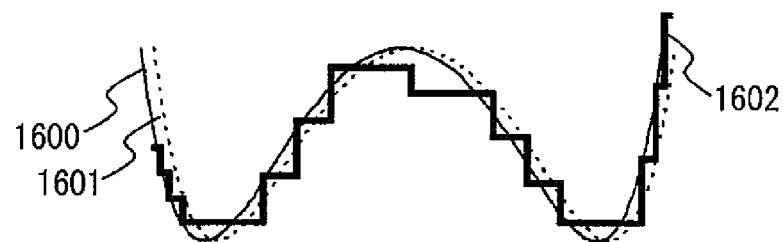
FIG. 16A is a diagram illustrating an example of a phase modulation profile to be displayed on a phase modulation element in an aberration correction device according to the third embodiment.
Figure 16B:
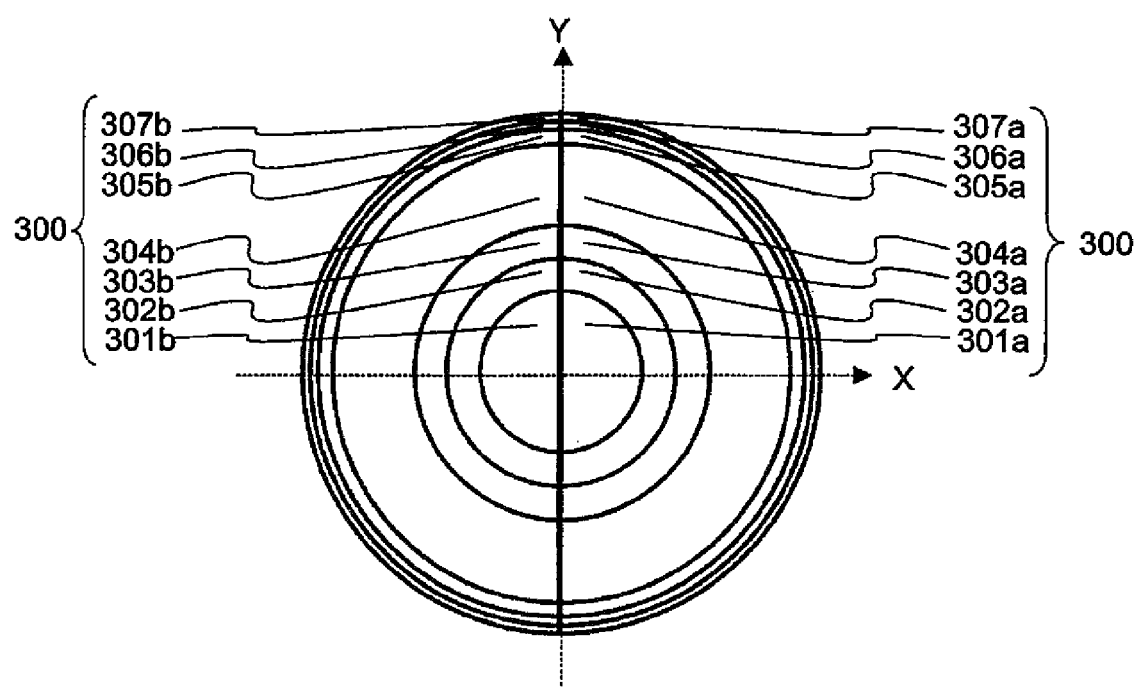
FIG. 16B is a diagram illustrating an example of an electrode pattern of the phase modulation element in the third embodiment.

FIG. 16A illustrates a phase modulation profile to be displayed on the phase modulation element. A curve 1600 indicated by the solid line and a curve 1601 indicated by the dotted line respectively represent phase modulation profiles identical to the phase modulation profiles 1400 and 1401 illustrated in FIG. 14A. FIG. 16B is a plan view illustrating disposition of transparent electrodes in the embodiment. In FIG. 16B, the bold lines in FIG. 16B illustrate spaces between the annular electrodes, and lead-out electrodes and other elements are not illustrated to simplify the illustration, as well as the configuration of FIG. 10 and FIG. 14B.

As illustrated in FIG. 16B, in the embodiment, each of all annular electrodes 300 provided in the phase modulation element is divided by a line (Y-axis in FIG. 16B) passing through the optical axis, thereby forming semi-annular electrodes 301a to 307a, and semi-annular electrodes 301b to 307b. Adjusting the voltages to be applied to the semi-annular electrodes by a control circuit 31 makes it possible to correct symmetrical aberrations, and asymmetrical aberrations generated with respect to a light flux obliquely incident on an objective lens 4 along X-axis direction orthogonal to Y-axis. A line 1602 in FIG. 16A is an example of a phase modulation profile for correcting asymmetrical aberrations with respect to an obliquely incident light flux, which is obtained by adjusting the voltages to be applied to the electrodes illustrated in FIG. 16B.

For instance, setting a voltage to be applied to each of the semi-annular electrodes 301a to 307a, and a voltage to be applied to each of the semi-annular electrodes 301b to 307b which are respectively linearly symmetrical to the semi-annular electrodes 301a to 307a with respect to Y-axis to be equal to each other by the control circuit 31 makes it possible to display a phase modulation profile for correcting symmetrical aberrations on the phase modulation element. Further, when asymmetrical aberrations generated with respect to an obliquely incident light flux are corrected, setting a voltage to be applied to each of the semi-annular electrodes 301a to 307a, and a voltage to be applied to each of the semi-annular electrodes 301b to 307b which are respectively linearly symmetrical to the semi-annular electrodes 301a to 307a with respect to Y-axis to be different from each other by the control circuit 31 allows for the aberration correction device 3 to correct asymmetrical aberrations along X-axis direction. As compared with the second embodiment, in the embodiment, the number of lead-out electrodes for connecting between each of the transparent electrodes and the control circuit 31 increases. However, the voltage application area is finely divided. Therefore, when asymmetrical aberrations are corrected, the aberration correction device 3 is capable of displaying, on the phase modulation element, a phase modulation profile that represents a phase distribution approximate to generated aberrations. This is advantageous in correcting asymmetrical aberrations.

Figure 17:
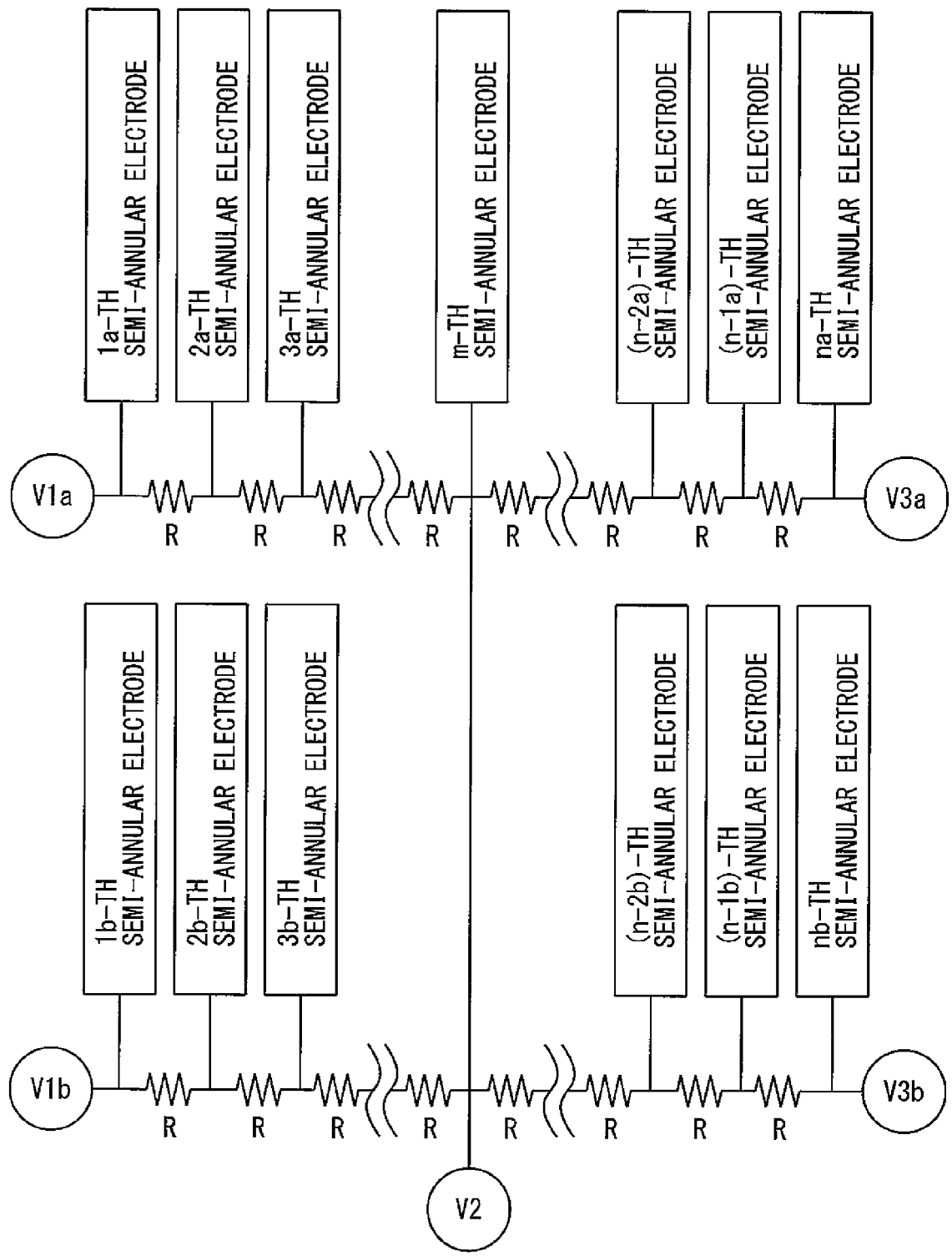
FIG. 17 is a diagram illustrating an example of electrodes to which voltages are applied by a control circuit in the aberration correction device according to the third embodiment.

FIG. 17 is a diagram illustrating an example of electrodes to which voltages are applied by the control circuit 31 among the semi-annular electrodes illustrated in FIG. 16B by 5-level driving. In FIG. 17, the center electrode 301a is referred to as the 1a-th semi-annular electrode, and the center electrode 301b which is linearly symmetrical to the center electrode 301a with respect to Y-axis is referred to as the 1b-th semi-annular electrode. Further, two semi-annular electrodes at the m-th position from the center, to which a maximum voltage is applied, are referred to as the m-th semi-annular electrodes. Further, the outermost peripheral semi-annular electrode 307a is referred to as the na-th semi-annular electrode, and the semi-annular electrode 307b which is linearly symmetrical to the semi-annular electrode 307a with respect to Y-axis is referred to as the nb-th semi-annular electrode. As well as the first and second embodiments, for the semi-annular electrodes, each two semi-annular electrodes adjacent to each other are connected by an electrode (a resistor) having a fixed electrical resistance, and the voltage difference between each two semi-annular electrodes adjacent to each other corresponds to a fixed step by resistance division. In this example, the control circuit 31 applies a voltage V1a to the 1a-th semi-annular electrode, and applies a voltage V1b to the 1b-th semi-annular electrode. Further, the control circuit 31 applies a maximum voltage V2 to the m-th semi-annular electrode, and applies voltages V3a and V3b to the outermost peripheral na-th and nb-th semi-annular electrodes, respectively. In this way, using 5 voltage levels to be controlled independently of each other by the control circuit 31 makes it possible to display an optimum phase modulation profile on the phase modulation element.

Further, as well as the second embodiment, the control circuit 31 may apply a voltage to each of the semi-annular electrodes in such a manner that a phase modulation profile for correcting a phase distribution obtained by combining asymmetrical aberrations (curve 1601) generated with respect to an obliquely incident light flux illustrated in FIG. 16A, and symmetrical aberrations (curve 1602) generated with respect to a light flux along the optical axis is displayed on the phase modulation element. In the above configuration, a fixed voltage application method is applied regardless of the incident angle of a light flux with respect to the objective lens 4. This allows for the aberration correction device 3 to correct both of symmetrical aberrations and asymmetrical aberrations in an average manner.

Further, in the embodiments described above, a liquid crystal element is used as the phase modulation element of the aberration correction device, but the phase modulation element is not limited to a liquid crystal element. For instance, an optical crystal element having an electro-optical effect as represented by a Pockels effect may be used as the phase modulation element. In this modification, as well as the case of using a liquid crystal element, electrodes having the same pattern as the electrode pattern of the symmetrical aberration correction element or of the asymmetrical aberration correction element as described above are mounted to face each other while sandwiching an optical crystal element therebetween.

As another modification, a deformable mirror may be used as the phase modulation element, although the deformable mirror is of a reflective-type mirror. In this modification, electrodes having the same pattern as the electrode pattern of the symmetrical aberration correction element or of the asymmetrical aberration correction element are mounted on the deformable mirror. Adjusting the voltage to be applied to each of the electrodes by the control circuit 31 makes it possible to represent a phase modulation profile that corrects aberrations of an optical system including an objective lens by the deformable mirror, and to impart a light flux reflected on the deformable mirror with a phase distribution in accordance with the phase modulation profile.

The embodiments have been described by way of example, in which the aberration correction device of the invention is used for a laser microscope. The invention is not limited to the foregoing embodiments. The aberration correction device of the invention is applicable to any apparatus configured such that a coherent light source and an objective lens are used, and a light flux may be obliquely incident on the objective lens by laser scanning, for instance, for implementing high resolution.

REFERENCE SIGNS LIST 100, 200 Laser microscope
1 Laser light source
2 Collimating optical system
3 Aberration correction device
3a Symmetrical aberration correction element (Phase modulation element)
3b Asymmetrical aberration correction element (Phase modulation element)
31 Control circuit
4 Objective lens
5 Specimen
6 Beam splitter
7 Confocal optical system
8 Confocal pinhole
9 Detector
10 Scan optical system
21, 22 Transparent substrate
23 Sealing member
33 Transparent electrode
34 Liquid crystal molecules

What is claimed is:

1. An aberration correction device for correcting wave front aberrations generated by an optical system including an objective lens disposed on an optical path of a light flux of coherent light to be emitted from a coherent light source, comprising:
   a symmetrical aberration correction element which corrects symmetrical aberrations among the wave front aberrations generated on the optical path, the symmetrical aberrations being wave front aberrations symmetrical with respect to an optical axis;
   an asymmetrical aberration correction element which corrects asymmetrical aberrations generated with respect to the light flux obliquely incident on the objective lens with a viewing angle at a periphery of an irradiation area of the coherent light, the asymmetrical aberrations being wave front aberrations asymmetrical with respect to the optical axis; and
   a control circuit configured to calculate a phase distribution pattern of the asymmetrical aberrations by adding the asymmetrical aberrations according to the viewing angle to residual aberrations of the symmetrical aberrations that remain after the correction of the symmetrical aberration by the symmetrical aberration correction element and depend on positional deviation due to oblique incidence of the light flux, obtain a phase modulation profile by inverting the phase distribution pattern, and make the asymmetrical aberration correction element display the phase modulation profile.

2. The aberration correction device according to claim 1, wherein
   the aberration correction device includes an effective region disposed on the optical path between the coherent light source and the objective lens at a position different from a position of a pupil of the objective lens, the effective region having a size larger than a size of the pupil of the objective lens so as to correct the wave front aberrations.

3. The aberration correction device according to claim 1, wherein
   the symmetrical aberration correction element and the asymmetrical aberration correction element are disposed along the optical axis.

4. The aberration correction device according to claim 3, wherein
   each of the symmetrical aberration correction element and the asymmetrical aberration correction element is a liquid crystal element.

5. The aberration correction device according to claim 1, wherein
   the symmetrical aberration correction element corrects the symmetrical aberrations by imparting, to the light flux, a phase modulation amount in accordance with a first phase modulation profile which is obtained by inverting a phase distribution pattern of first-order spherical aberration to be obtained by resolving the wave front aberrations corresponding to the symmetrical aberrations into Zernike polynomials.

6. The aberration correction device according to claim 1, wherein
   the symmetrical aberration correction element corrects the symmetrical aberrations by imparting, to the light flux, a phase modulation amount in accordance with a first phase modulation profile which is obtained by inverting a phase distribution pattern constituted of a sum of a phase distribution pattern of first-order spherical aberration and a phase distribution pattern of second-order spherical aberration to be obtained by resolving the wave front aberrations corresponding to the symmetrical aberrations into Zernike polynomials.

7. A laser microscope comprising:
   a light source which irradiates a light flux of coherent light;
   a first optical system which scans a specimen with the light flux from the light source;
   an objective lens which focuses the light flux on the specimen;
   a detector;
   a second optical system which transmits, to the detector, a second light flux including specimen information output from the specimen by incidence of the light flux on the specimen; and
   an aberration correction device which is disposed between the light source and the objective lens
   wherein
   the aberration correction device comprises:
   a symmetrical aberration correction element which corrects symmetrical aberrations among wave front aberrations generated on an optical path of the coherent light, the symmetrical aberrations being wave front aberrations symmetrical with respect to an optical axis of the objective lens;
   an asymmetrical aberration correction element which corrects asymmetrical aberrations generated with respect to the light flux of the coherent light obliquely incident on the objective lens with a viewing angle at a periphery of an irradiation area of the coherent light, the asymmetrical aberrations being wave front aberrations asymmetrical with respect to the optical axis; and
   a control circuit configured to calculate a phase distribution pattern of the asymmetrical aberrations by adding the asymmetrical aberrations according to the viewing angle to residual aberrations of the symmetrical aberrations that remain after the correction of the symmetrical aberration by the symmetrical aberration correction element and depend on positional deviation due to oblique incidence of the light flux, obtain a phase modulation profile by inverting the phase distribution pattern, and make the asymmetrical aberration correction element display the phase modulation profile.

8. The laser microscope according to claim 7, wherein the aberration correction device is disposed, on a side of the light source than the objective lens, at a position between the objective lens, and the first optical system and the second optical system.

* * * * *